US011619848B2

(12) United States Patent
Koide

(10) Patent No.: US 11,619,848 B2
(45) Date of Patent: *Apr. 4, 2023

(54) DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/692,848

(22) Filed: Mar. 11, 2022

(65) Prior Publication Data

US 2022/0197075 A1 Jun. 23, 2022

Related U.S. Application Data

(63) Continuation of application No. 17/109,631, filed on Dec. 2, 2020, now Pat. No. 11,300,840, which is a
(Continued)

(30) Foreign Application Priority Data

Apr. 10, 2017 (JP) .............................. JP2017-077525

(51) Int. Cl.
G02F 1/1345 (2006.01)
G02F 1/1333 (2006.01)
(Continued)

(52) U.S. Cl.
CPC ...... G02F 1/13454 (2013.01); G02F 1/13338 (2013.01); G02F 1/134363 (2013.01); G06F 3/044 (2013.01); G06F 3/0412 (2013.01); G06F 3/0416 (2013.01); G06F 3/0445 (2019.05); G06F 3/0446 (2019.05); G06F 3/04164 (2019.05); G06F 3/04184 (2019.05); G09G 3/3611 (2013.01); G09G 3/3648 (2013.01); G09G 3/3655 (2013.01);
(Continued)

(58) Field of Classification Search
None
See application file for complete search history.

(56) References Cited

U.S. PATENT DOCUMENTS

2010/0214195 A1 8/2010 Ogasawara et al.
2011/0102405 A1* 5/2011 Harada ............... G02F 1/13306
345/100

(Continued)

FOREIGN PATENT DOCUMENTS

JP 2016-148775 8/2016
WO WO 2009/057342 A1 5/2009
WO WO 2014/010463 A1 1/2014

Primary Examiner — Christopher J Kohlman
(74) Attorney, Agent, or Firm — Maier & Maier, PLLC

(57) ABSTRACT

According to one embodiment, a display device includes a first common electrode and a second common electrode arranged in a first direction, a first switch unit selectively supplying a first drive signal or a second drive signal different from the first drive signal to the first common electrode, and a second switch unit selectively supplying the first drive signal or the second drive signal to the second common electrode, wherein the second common electrode and the first switch unit are arranged in a second direction intersecting the first direction, the first switch unit comprises a first switch circuit and a second switch circuit arranged in the second direction.

11 Claims, 17 Drawing Sheets

Related U.S. Application Data continuation of application No. 16/837,639, filed on Apr. 1, 2020, now Pat. No. 10,884,302, which is a continuation of application No. 15/944,881, filed on Apr. 4, 2018, now Pat. No. 10,642,111.

(51) Int. Cl.
| | | |
|---|---|---|
| *G02F 1/1343* | (2006.01) | |
| *G09G 3/36* | (2006.01) | |
| *G06F 3/041* | (2006.01) | |
| *G06F 3/044* | (2006.01) | |
| *G02F 1/1368* | (2006.01) | |
| *G02F 1/1362* | (2006.01) | |

(52) U.S. Cl.
CPC ...... *G02F 1/1368* (2013.01); *G02F 1/134318* (2021.01); *G02F 1/136218* (2021.01); *G02F 2201/121* (2013.01); *G02F 2201/123* (2013.01); *G02F 2201/56* (2013.01); *G06F 2203/04107* (2013.01); *G09G 2300/0426* (2013.01); *G09G 2300/08* (2013.01)

(56) References Cited

U.S. PATENT DOCUMENTS

| | | |
|---|---|---|
| 2015/0084888 A1 | 3/2015 | Han |
| 2015/0211707 A1 | 7/2015 | Watanabe |
| 2016/0240157 A1 | 8/2016 | Aoki et al. |
| 2017/0031217 A1 | 2/2017 | Jung |
| 2019/0042038 A1* | 2/2019 | Lee .................. G06F 3/047 |

* cited by examiner

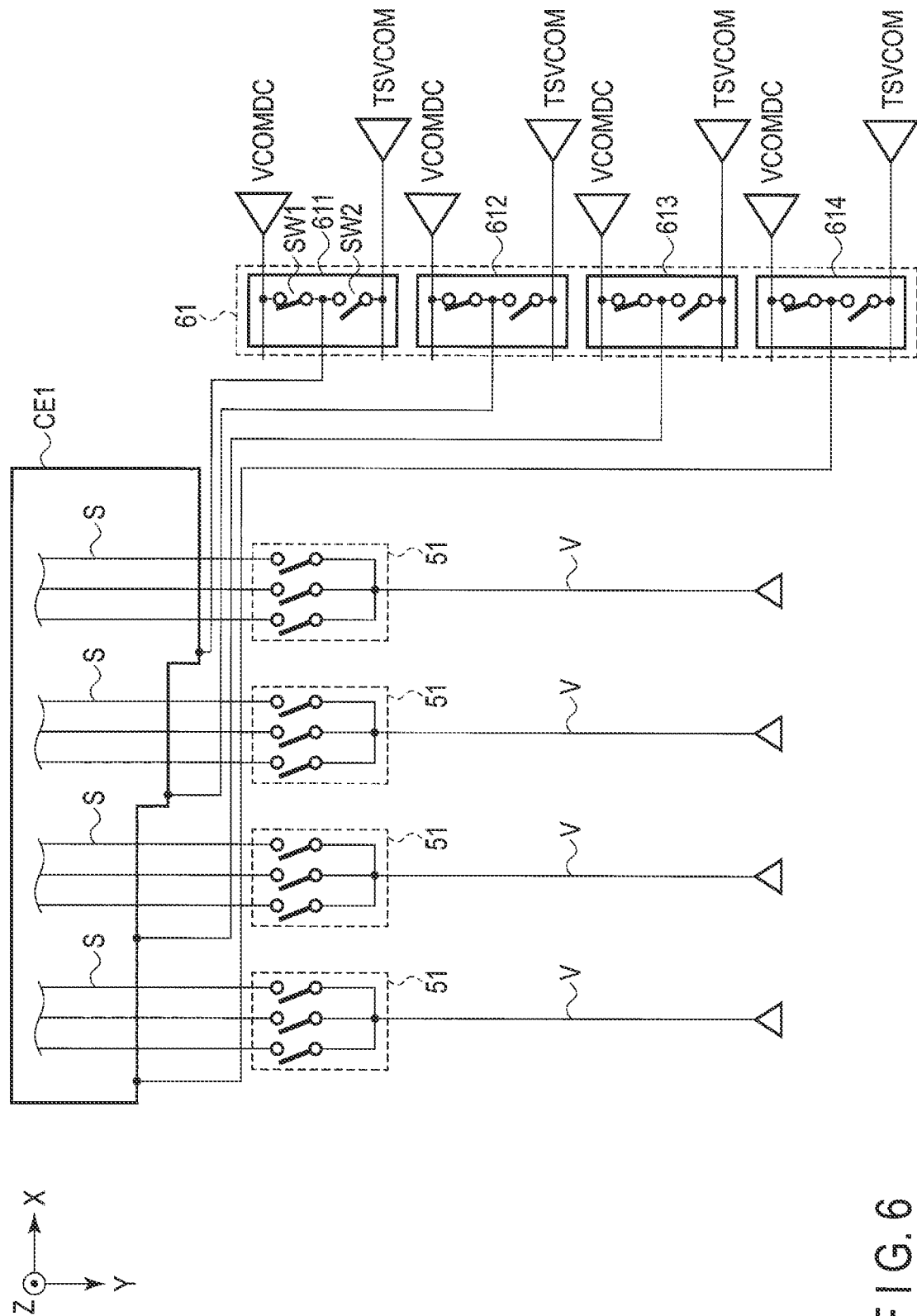
F I G. 6

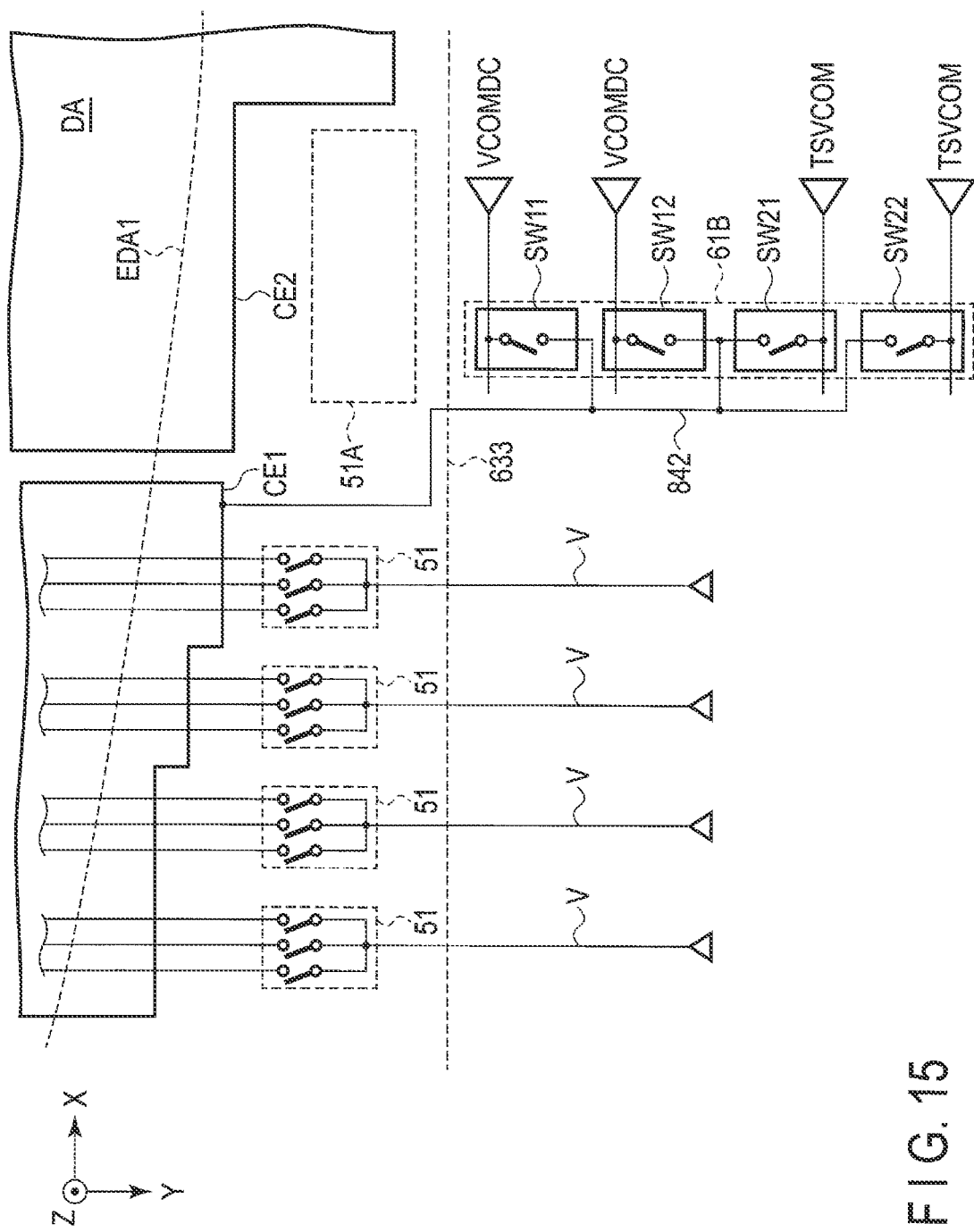
F I G. 15

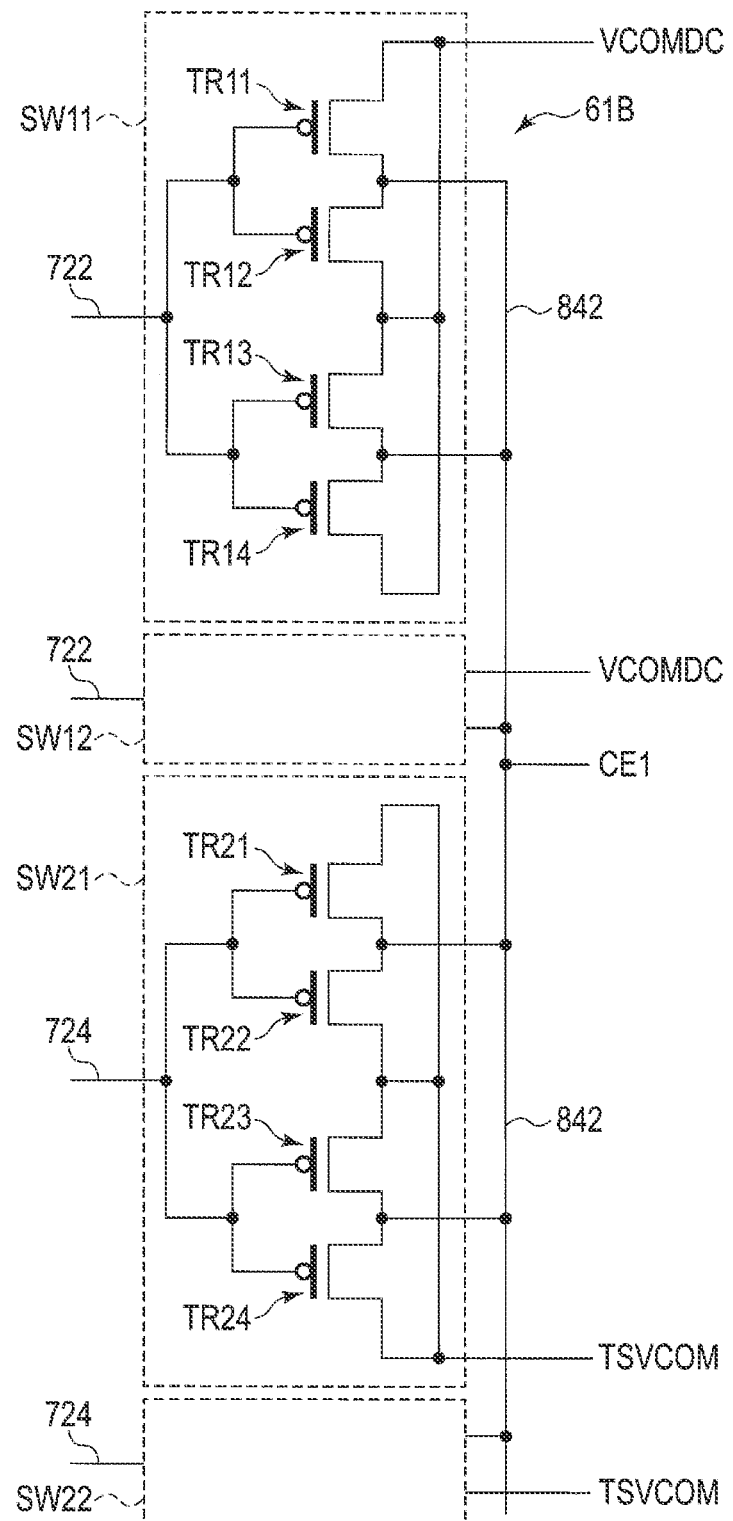
F I G. 16

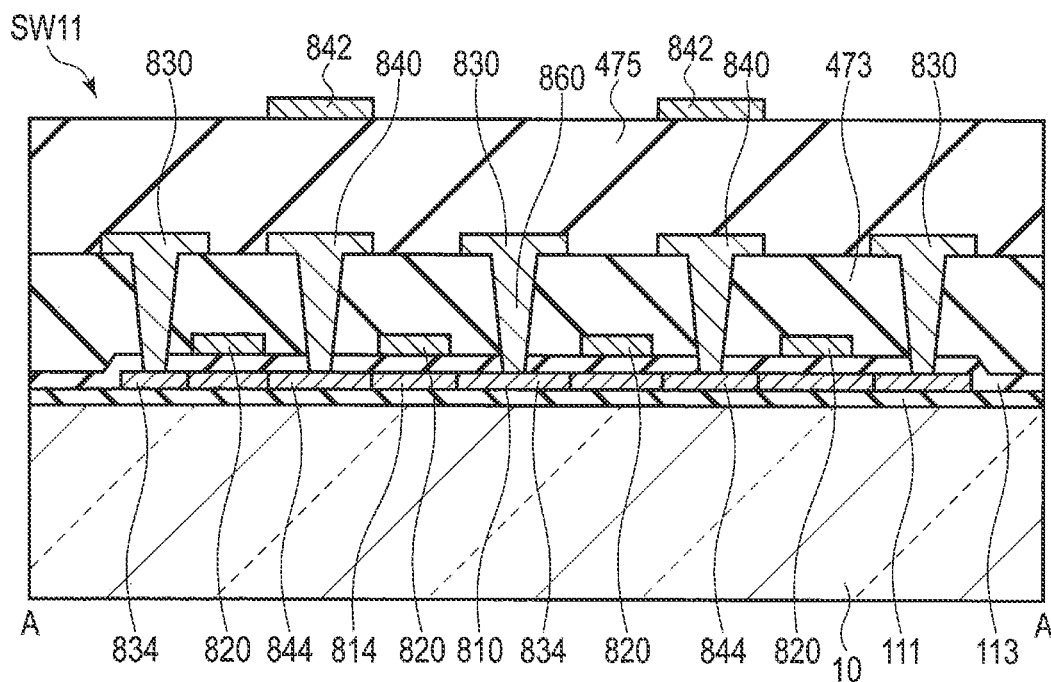
F I G. 19
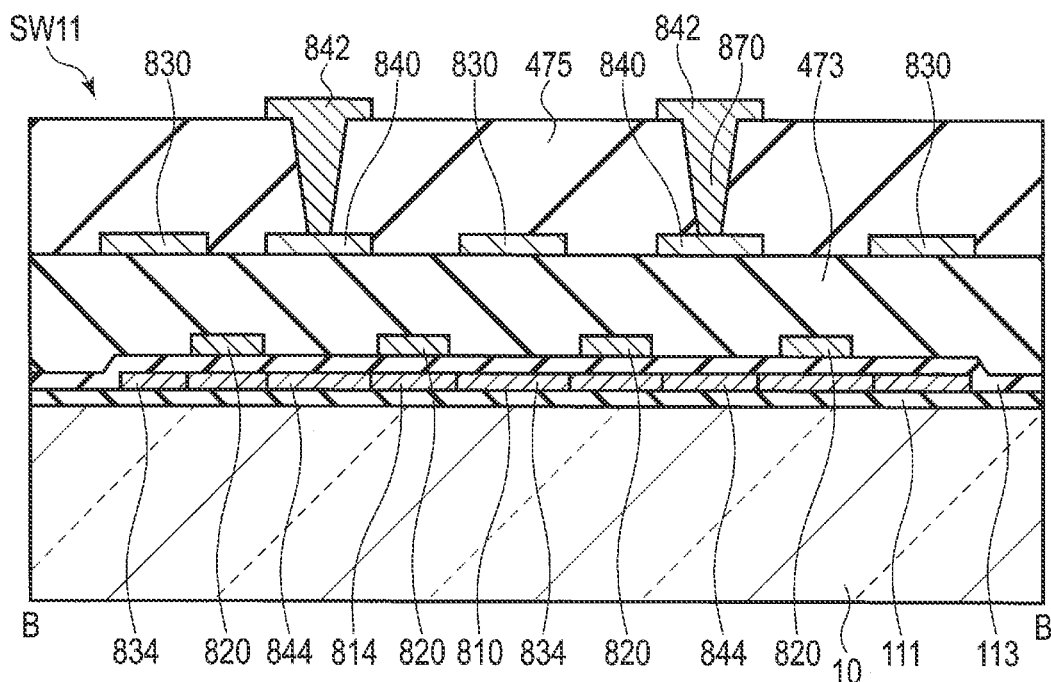
F I G. 20

DISPLAY DEVICE

CROSS-REFERENCE TO RELATED APPLICATIONS

This application is a continuation of U.S. application Ser. No. 17/109,631 filed Dec. 2, 2020, which is a continuation of U.S. application Ser. No. 16/837,639 filed Apr. 1, 2020, which is a continuation of U.S. application Ser. No. 15/944,881 filed Apr. 4, 2018, and which is based upon and claims the benefit of priority from Japanese Patent Application No. 2017-077525, filed Apr. 10, 2017, the entire contents of each of which are incorporated herein by reference.

FIELD

Embodiments described herein relate generally to a display device.

BACKGROUND

A display device such as a liquid crystal display device and an organic electroluminescent display device comprises a display area in which pixels are aligned and a peripheral area surrounding the display area, and peripheral circuit driving the pixels are disposed in the peripheral area.

Recently, technologies for narrowing a frame of the display device have been various reviewed. To implement narrowing the frame of the display device, the layout of the peripheral circuits needs to be formed efficiently and the area of the peripheral area needs to be smaller.

BRIEF DESCRIPTION OF THE DRAWINGS

FIG. 6 is a diagram showing a configuration example of a switch unit 61.

FIG. 15 is a diagram showing a modified example of the switch unit.

FIG. 16 is a circuit diagram showing switch unit 61B shown in FIG. 15.

FIG. 19 is a cross-sectional view seen along line A-A in FIG. 18.

FIG. 20 is a cross-sectional view seen along line B-B in FIG. 18.

DETAILED DESCRIPTION

In general, according to one embodiment, a display device includes: a first common electrode and a second common electrode arranged in a first direction; a first switch unit selectively supplying a first drive signal or a second drive signal different from the first drive signal to the first common electrode; and a second switch unit selectively supplying the first drive signal or the second drive signal to the second common electrode, wherein the second common electrode and the first switch unit are arranged in a second direction intersecting the first direction, the first switch unit comprises a first switch circuit and a second switch circuit arranged in the second direction.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. To more clarify the explanations, the drawings may pictorially show width, thickness, shape and the like of each portion as compared with actual embodiments, but they are mere examples and do not restrict the interpretation of the invention. Furthermore, in the description and Figures of the present application, structural elements having the same or similar functions will be referred to by the same reference numbers and detailed explanations of them that are considered redundant may be omitted.

In the embodiments, a liquid crystal display device comprising a touch detection function will be described as an example of the display device. The liquid crystal display device can be used for, for example, various devices such as a smartphone, a tablet terminal, a mobile telephone terminal, a notebook computer, a TV receiver, a vehicle-mounted device, and a game console. The major configuration explained in the embodiments can also be applied to a self-luminous display device such as an organic electroluminescent display element, and the like, an electronic paper-type display device comprising an electrophoretic element, and the like, a display device employing micro-electromechanical systems (MEMS), or a display device employing electrochromism. In addition, a configuration concerning the image display disclosed in the embodiments can also be applied to a display device which does not comprise a touch detection function.

Figure 1:
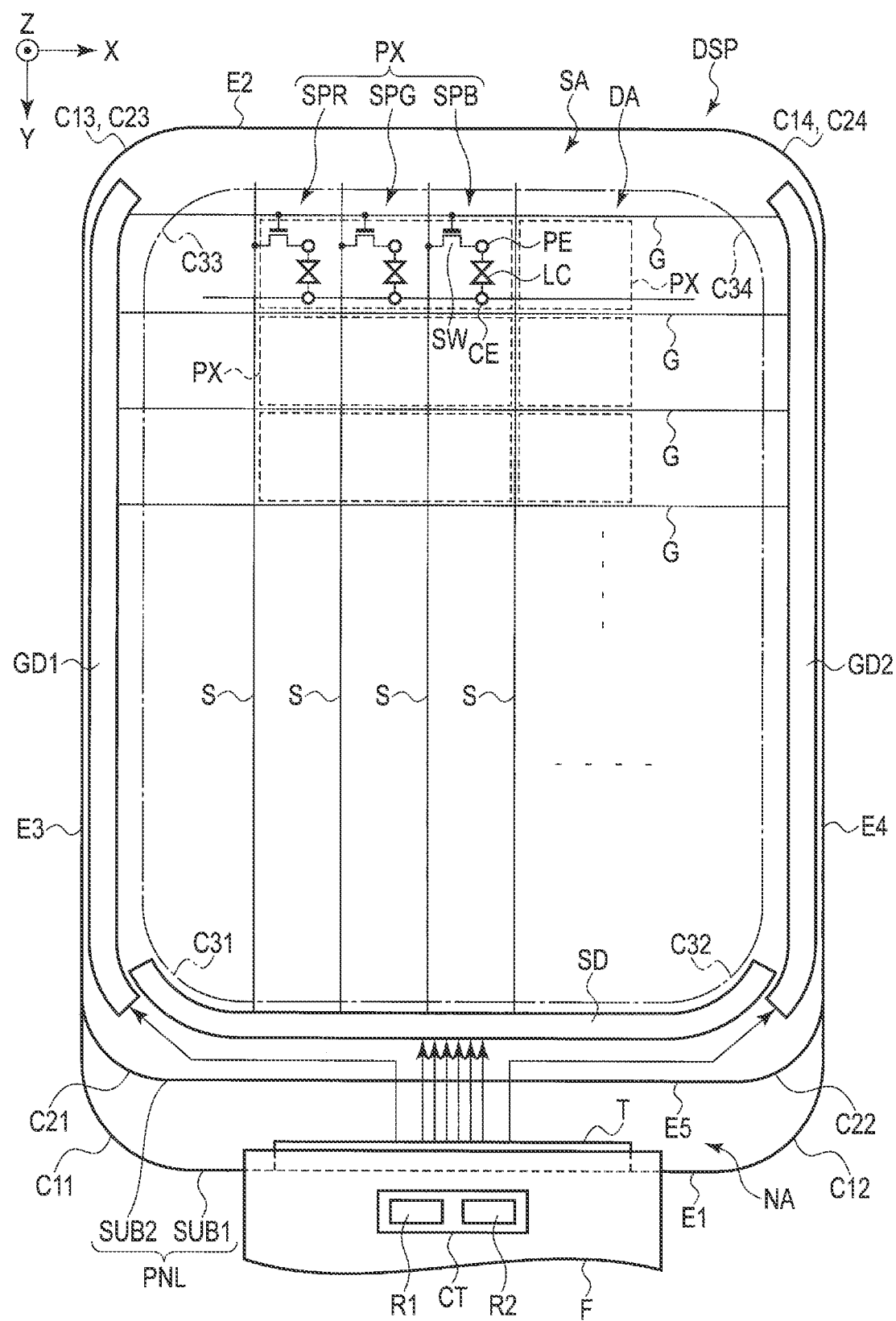
FIG. 1 is a plan view showing a configuration example of a display device according to one of embodiments.

FIG. 1 is a plan view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than 90 degrees. In the present specification, a position of a distal side of arrow indicating the third direction Z is called an upper position (or merely above), while a position of a side opposite to the distal end of the arrow is called a lower position (or merely below).

The display device DSP comprises a display panel PNL, a wiring substrate F, and a controller CT. The display panel PNL comprises a first substrate SUB1, a second substrate SUB2, and a liquid crystal layer LC disposed between the first substrate SUB1 and the second substrate SUB2 (for more details, see FIG. 3). Furthermore, the display panel PNL comprises a display area DA on which an image is displayed and a frame-shaped peripheral area SA surrounding the display area DA.

The display panel PNL includes an edge E1, an edge E2 located on a side of the display area DA which is opposed to the edge E1, an edge E3, and edges E4 and E5 located on sides of the display area DA which are opposed to the edge E3. In the example illustrated in FIG. 1, the edges E1, E2, and E5 extend in the first direction X, and the edges E3 and E4 extend in the second direction Y. At each of the edges E2, E3, and E4, edges of the first substrate SUB1 and the second substrate SUB2 overlap. The edge E1 corresponds to the edge of the first substrate SUB1. The edge E5 corresponds to the edge of the second substrate SUB2. The edge E5 is located on a side closer to the display area DA than to the edge E1. The display panel PNL includes a non-opposition area NA (or a terminal area) where the first substrate SUB1 is not opposed to the second substrate SUB2 between the edges E1 and E5.

The first substrate SUB1 includes a corner portion C11 between the edge E1 and the edge E3, a corner portion C12 between the edge E1 and the edge E4, a corner portion C13 between the edge E2 and the edge E3, and a corner portion C14 between the edge E2 and the edge E4. The second substrate SUB2 includes a corner portion C21 between the edge E5 and the edge E3, which is located near the corner portion C11, a corner portion C22 between the edge E5 and the edge E4, which is located near the corner portion C12, a corner portion C23 which overlaps the corner portion C13, and a corner portion C24 which overlaps the corner portion C14. The display area DA includes a corner portion C31 located near the corner portion C11, a corner portion C32 located near the corner portion C12, a corner portion C33 located near the corner portion C13, and a corner portion C34 located near the corner portion C14. A one-dot-chained line in the figure corresponds to the edge of the display area DA, and this edge includes the corner portions C31 to C34.

In the example illustrated in FIG. 1, the corner portions C11 to C14 of the first substrate SUB1, the corner portions C21 to C24 of the second substrate SUB2, and the corner portions C31 to C34 of the display area DA are rounded, and are often hereinafter called round portions. For example, the corner portions are formed in an arcuate shape, the corner portions C11 to C14 of the first substrate SUB1 and each of the corner portions C23 and C24 of the second substrate SUB2 has a first radius of curvature, each of the corner portions C21 and C22 of the second substrate SUB2 has a second radius of curvature, and each of the corner portions C31 to C34 of the display area DA has a third radius of curvature. The first to third radii of curvature are different from one another and, for example, the first radius of curvature can be set to be greater than the third radius of curvature and the third radius of curvature can be set to be greater than the second radius of curvature. However, the relationship among the corner portions C11 to C14, C21 to C24, and C31 to C34 is not limited to this example. In addition, at least one of the corner portions C11 to C14, C21 to C24, and C31 to C34 may not be arcuate, but may be a right angle or polygonal.

The display panel PNL includes scanning lines G and signal lines S in the display area DA. The scanning lines G extend in the first direction X so as to be arranged in the second direction Y and spaced apart. The signal lines S extend in the second direction Y so as to be arranged in the first direction X and spaced apart.

The display area DA includes pixels PX arrayed in the first direction X and the second direction Y. The pixels PX correspond to areas surrounded by dotted lines in the figure. Each of the pixels PX includes sub-pixels SP displaying different colors. For example, the pixel PX includes a red sub-pixel SPR, a green sub-pixel SPG, and a blue sub-pixel SPB. The configuration of the pixel PX is not limited to this, but may further include, for example, a sub-pixel displaying a white color, or the like or sub-pixels corresponding to the same color. In the present disclosure, the sub-pixel is often simply called a pixel.

Each of the sub-pixels SP comprises a switching element SW, a pixel electrode PE, and a common electrode CE. For example, the common electrode CE is formed to spread across the sub-pixels SP. The switching element SW is electrically connected to the scanning line G, the signal line S, and the pixel electrode PE.

The display panel PNL comprises scanning line drivers GD1 and GD2 (first drivers) connected to the scanning lines G, and a signal line driver SD (second driver) connected to the signal lines S. The scanning line driver GD1 is disposed between the display area DA and the edge E3, and the scanning line driver GD2 is disposed between the display area DA and the edge E4. The signal line driver SD is disposed between the display area DA and the edge E5. Either of the scanning line drivers GD1 and GD2 may not be disposed.

In the example shown in FIG. 1, the scanning line driver GD1 is provided in areas curved in an arcuate shape similarly to the corner portions C31 and C33, at a position close to the corner portions C31 and C33. The scanning line driver GD2 is provided in areas curved in an arcuate shape similarly to the corner portions C32 and C34, at positions close to the corner portions C32 and C34. The signal line driver SD is provided in areas curved in an arcuate shape similarly to the corner portions C31 and C32, at positions close to the corner portions C31 and C32. The end portion of the signal line driver SD at a position close to the corner portion C31 is located between the scanning line driver GD1 and the display area DA. The end portion of the signal line driver SD at a position close to the corner portion C32 is located between the scanning line driver GD2 and the display area DA.

The scanning line drivers GD1 and GD2 supply scanning signals to the scanning lines G. The signal line driver SD supplies video signals to the signal lines S. If the scanning signal is supplied to the scanning line G corresponding to a certain switching element SW and the video signal is supplied to the signal line S connected to this switching element SW, a voltage corresponding to this video signal is applied to the pixel electrode PE. In contrast, a voltage corresponding to a DC common signal (first drive signal) is applied to the common electrode CE. At this time, an alignment state of the liquid crystal molecules contained in the liquid crystal layer LC is varied in accordance with the magnitude of an electric field generated between the pixel electrode PE and the common electrode CE. An image is displayed in the display area DA by this operation.

A connection terminal T is provided along the edge E1 in the non-opposition area NA. A wiring substrate F is connected to the connection terminal T. In the example shown in FIG. 1, the controller CT is mounted on the wiring substrate F. The controller CT comprises a display driver R1 for controlling the scanning line drivers GD1 and GD2 and the signal line driver SD, and a detection driver R2 for touch detection. The manner of mounting the display driver R1 and the detection driver R2 is not limited to this, but the drivers may be mounted on, for example, the first substrate SUB1. In addition, the display driver R1 and the detection driver R2 may be mounted on different members.

Figure 2:
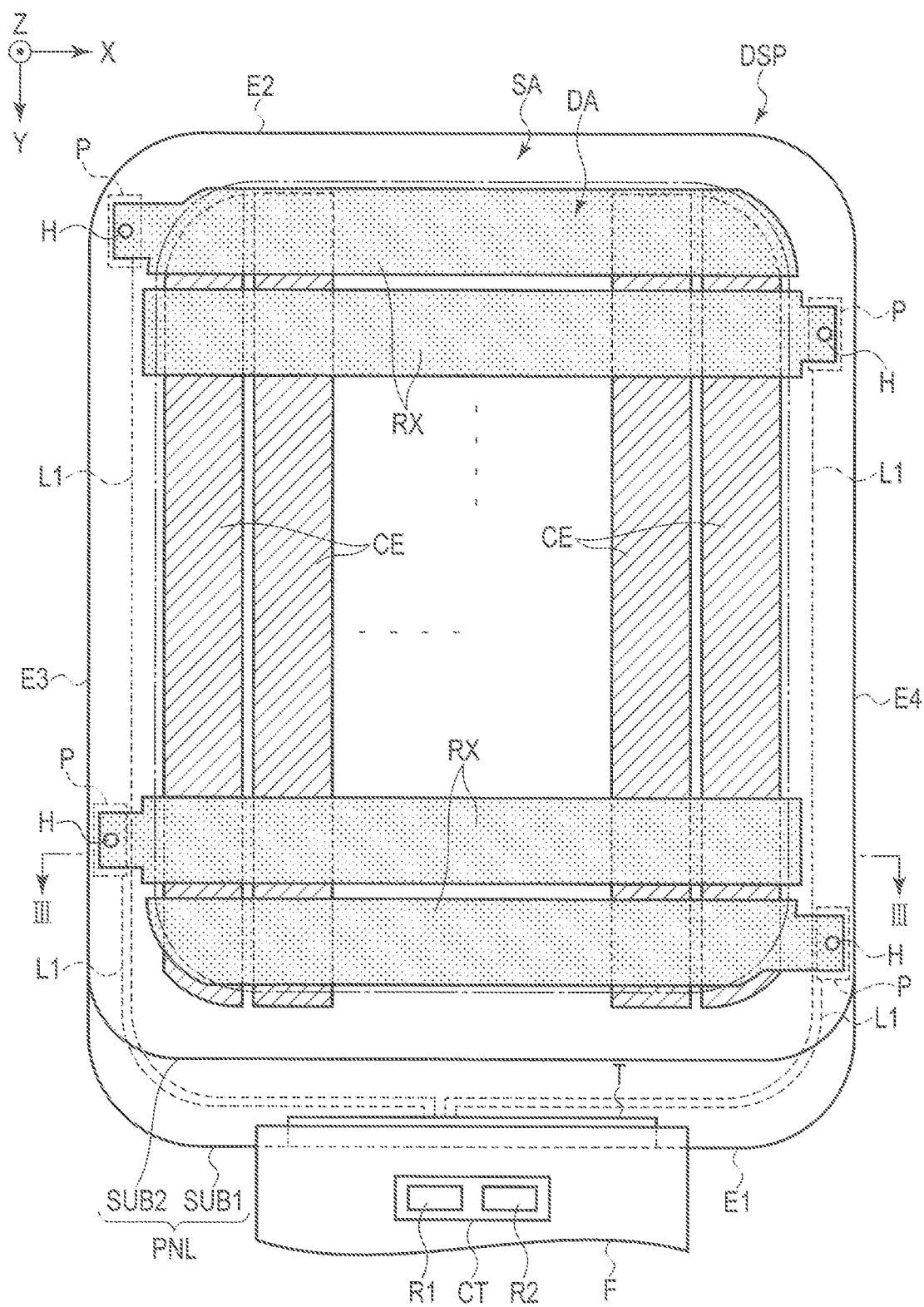
FIG. 2 is a plan view showing a configuration example of the display device concerning a touch detection function.

FIG. 2 is a plan view showing the display device DSP, illustrating a configuration example concerning a touch detection function. The display device DSP comprises detection electrodes RX. Each of the detection electrodes RX extends in the first direction X and is arranged in the second direction Y, in the display area DA. Furthermore, in the example shown in FIG. 2, the common electrodes CE are disposed in the display area DA. The common electrodes CE extend in the second direction Y and are arranged in the first direction X.

The common electrode CE has a function of a drive electrode for detecting an object approaching the display area DA together with the detection electrode RX in addition to a function of an electrode for image display. In the embodiments, it is assumed that the common electrodes CE are disposed on the first substrate SUB1 and the detection electrodes RX are disposed on the second substrate SUB2. However, a configuration of providing drive electrodes different from the common electrodes CE can also be applied to the display device DSP. In addition, arrangement of the detection electrodes RX and the common electrodes CE (or drive electrodes) can be variously modified. For example, the detection electrodes RX may be arranged in the first direction X and the common electrodes CE may be arranged in the second direction Y. In addition, the common electrodes CE (or drive electrodes) may be provided on the second substrate SUB2. The detection electrodes RX and drive electrodes different from the common electrodes CE may be provided on a transparent base disposed on the display surface of the display panel PNL.

In the example illustrated in FIG. 2, the first substrate SUB1 comprises pads P and leads L1 electrically connecting the pads P to the connection terminal T, in the peripheral area SA. The detection electrodes RX are electrically connected to the pads P via contact holes H. The pads P are electrically connected to the connection terminal T via the leads L1. For example, as shown in the figure, the detection electrodes RX which are odd-numbered from the edge E2 are connected to the pads P disposed between the edge E3 and the display area DA, and the detection electrodes Rx which are even-numbered from the edge E2 are connected to the pads P disposed between the edge E4 and the display area DA.

Figure 3:
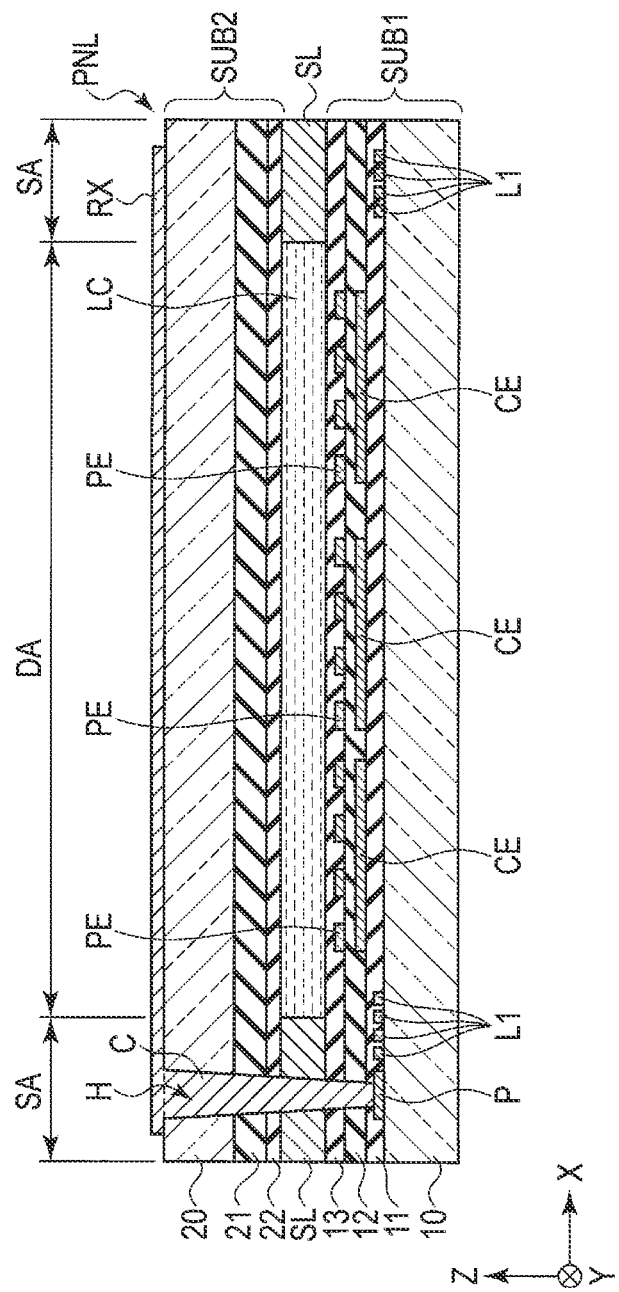
FIG. 3 is a cross-sectional view showing a display panel seen along line III-III in FIG. 2.

FIG. 3 is a cross-sectional view showing the display panel PNL seen along line III-III in FIG. 2. The first substrate SUB1 includes a first base 10 of a glass substrate, a resin substrate or the like, a first insulating layer 11, a second insulating film 12, a first alignment film 13, and the above-explained common electrodes CE and the pixel electrodes PE. The first substrate SUB1 also comprises the above-explained scanning lines G, signal lines S, switching elements SW and the like, but their illustration is omitted in FIG. 3.

The pads P and the leads L1 are disposed on the first base 10. An insulating layer is intervened between the pads P and the first base 10, and between the leads L1 and the first base 10. The first insulating layer 11 covers the pads P and the leads L1. The pads P and the leads L1 may be located in the same layer or different layers, though not described in detail. In addition, parts of the leads L1 may be located in the same layer as the pads P.

The common electrodes CE are disposed on the first insulating layer 11. The second insulating layer 12 covers the common electrodes CE and the first insulating layer 11. The pixel electrodes PE are disposed on the second insulating layer 12 and opposed to the common electrodes CE via the second insulating layer 12. The first alignment film 13 covers the pixel electrodes PE and the first insulating layer 12.

The second substrate SUB2 comprises a second base 20 of a glass substrate, a resin substrate or the like, a color filter layer 21, and a second alignment film 22. The color filter layer 21 is disposed below the second base 20. The color filter layer 21 includes light-shielding layers disposed between the sub-pixels of the display area DA and in the peripheral area SA. The second alignment film 22 covers the color filter layer 21. The color filter layer 21 may be disposed on the first substrate SUB1.

The first substrate SUB1 and the second substrate SUB2 are attached to each other by a sealing member SL. The liquid crystal layer LQ is sealed in space surrounded by the first alignment film 13, the second alignment film 22, and the sealing member SL.

The detection electrode RX is disposed on the second base 20. The above-explained contact hole H penetrates the second base 20, the color filter layer 21, the second alignment film 22, the sealing member SL, the first alignment film 13, the second insulating layer 12, and first insulating layer 11. The contact hole H may further penetrate the pad P. The contact hole H is, for example, tapered toward the pad P as illustrated in the figure but the shape is not limited to this example. A conductive connecting member C is disposed inside the contact hole H. The detection electrode RX and the pad P are electrically connected via the connection member C.

The pixel electrodes PE and the common electrodes CE can be formed of, for example, a transparent conductive material such as indium tin oxide (ITO) or the like. The detection electrodes RX, the pads P, and the leads L1 can be formed of a transparent conductive material or a metal material such as ITO. If the detection electrodes RX are formed of a metal material, for example, an electrode pattern formed by arranging metal wires of a single-layer or multi-layer structure in a mesh or waveform shape.

The cross-sectional structure shown in FIG. 3 is a mere example but various structures can be applied to the display panel PNL. For example, the common electrodes CE may be disposed between the pixel electrodes PE and the liquid crystal layer LC, disposed in the same layer as the pixel electrodes PE, or disposed on the second substrate SUB2. In addition, the first alignment film 13, the color filter layer 21 or the second alignment film 22 may not be disposed at a position of the contact hole H.

In the above configuration, a first capacitance is formed between the detection electrodes RX and the common electrodes CE. In addition, if an object such as a user's finger approaches the display area DA, a second capacitance is formed between the object and the detection electrodes RX. The detection driver R2 supplies an alternating drive signal (second drive signal) for object detection to the common electrodes CE. At this time, detection signals are output from the detection electrodes RX to the detection driver R2 via the first capacitance. The detection signals are varied in accordance with the presence of the second capacitance or the magnitude of the second capacitance. Therefore, the detection driver R2 can detect the presence of the object approaching the display area DA and the position of the object in the display area DA, based on the detection signals.

The detection mode explained here is called, for example, mutual-capacitive mode. However, the object detection mode is not limited to the mutual-capacitive mode but may be the self-capacitive mode. In the self-capacitive mode, the drive signals are supplied to the detection electrodes RX and read from the detection electrodes RX, and the presence of the object approaching the display area DA and the position of the object in the display area DA, can be detected based on the detection signals. In addition, in the self-capacitive mode, the drive signals may be supplied to the common electrodes CE and read from the common electrodes CE.

Next, a configuration of peripheral circuit (scanning line drivers GD1 and GD2, signal line driver SD, and the like) disposed in the peripheral area SA will be explained.

Figure 4:
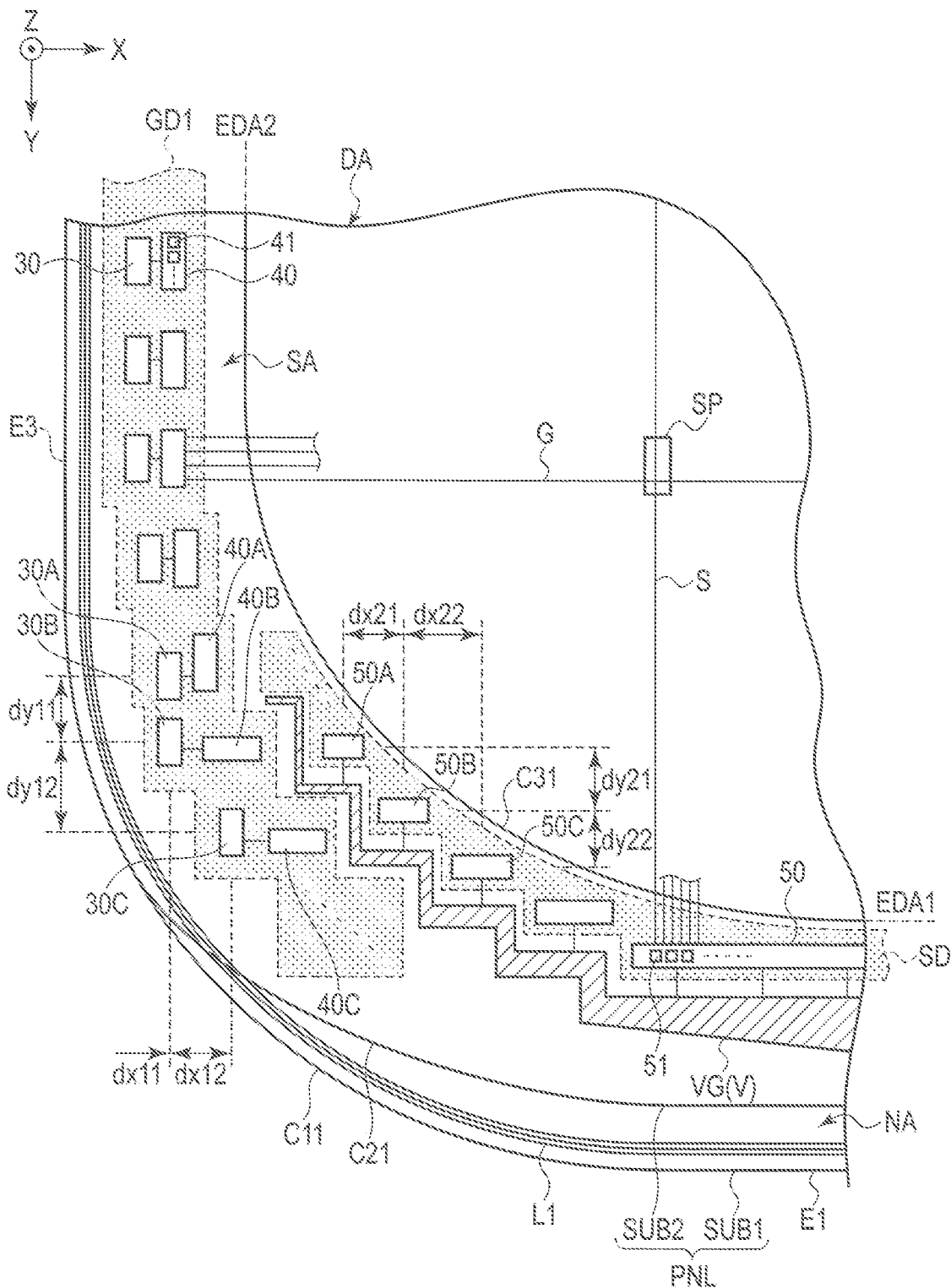
FIG. 4 is a plan view showing a configuration example of peripheral circuits near a corner of the display area.

FIG. 4 is a plan view showing a configuration example of the peripheral circuits at positions close to the corner portions C11, C21, and C31. The scanning line driver GD1 comprises shift register units 30 and buffer units 40 which are connected to the shift register units 30, respectively, and which are connected to at least one scanning line G. The shift register units 30 constitute shift registers controlling the timing for sequentially supplying the scan signals to the scanning lines G. Each of the buffer units 40 includes at least one buffer circuit 41. The buffer circuit 41 supplies a scanning signal (scanning voltage) to the scanning line G under control of the shift register unit 30.

The first substrate SUB1 comprises a video line group VG including video lines V, in the peripheral area SA. The video line group VG is disposed along the signal line driver SD. Video lines V constituting the video line group VG are electrically connected to the display driver R1 via the connection terminal T and the wiring substrate F. In the example shown in FIG. 4, the signal line driver SD is disposed between the video line group VG and the display area DA. Furthermore, the video line group VG extends between the scanning line driver GD1 and the signal line driver SD, in an area where the signal line driver SD is located between the scanning line driver GD1 and the display area DA.

The signal line driver SD comprises selector units 50. Each of the selector units 50 includes at least one selector circuit 51 (selector switch). N video lines V and M signal lines S where M is greater than N (M>N) are connected to the selector circuit 51. For example, N is two and M is six. The selector circuit 51 changes the signal lines S connected to the video lines V in time division. The video signal can be thereby supplied to each of the signal lines S by the video lines V whose number is smaller than the number of the signal lines S disposed in the display area DA.

The leads L1 making connection between the detection electrodes RX and the connection terminal T are disposed along edges of the first substrate SUB1. In other words, the scanning line driver GD1, the signal line driver SD, and the video line group VG are located between the leads L1 and the display area DA. The lead L1 is curved in an arcuate shape similarly to the corner portion C11, at a position close to the corner portion C11. In the example shown in FIG. 4, a distance between the lead L1 and the edge of the first substrate SUB1 is constant over the entire body but may be different partially. For example, the distance between the lead L1 and the edge of the first substrate SUB1 may be increased toward the edge E1, at a position close to the corner portion C11.

The scanning line driver GD1 and the signal line driver SD are provided in an area curved along the corner portion C31, at a position close to the corner portion C31 of the display area DA. Therefore, the signal line driver SD at a position close to the corner portion C31 is partially located on a side (upper side in the figure) closer to the edge E2 than to the an edge EDA1 of the display area DA which is the closest to the edge E1. In addition, the scanning line driver GD1 at a position close to the corner portion C31 is located on a side (right side in the figure) closer to the edge E4 than to the an edge EDA2 of the display area DA which is the closest to the edge E3.

The number of the selector circuits 51 included in each of the selector units 50 becomes smaller in the selector unit 50 closer to the end portion of the signal line driver SD. The width of the selector unit 50 in the first direction X becomes smaller in the selector unit 50 closer to the end portion of the signal line driver SD.

In the example shown in FIG. 4, the video line group VG is formed in a step shape in which the portions extending in the first direction X the portions extending in the second direction Y repeat alternately, and one selector unit 50 is disposed on each step. However, the selector units 50 may be disposed on one step. In addition, at least several part of the video line group VG may extend in a direction intersecting the first direction X and the second direction Y.

For example, explanation will be focused on shift register units 30A, 30B, and 30C and buffer units 40A, 40B, and 40C connected to the shift register units, of the shift register units 30 and the buffer units 40. The shift register units 30A and 30B are adjacent to each other and the shift register units 30B and 30C are adjacent to each other. In addition, the buffer units 40A and 40B are adjacent to each other and the buffer units 40B and 40C are adjacent to each other.

An interval between the shift register units 30A and 30B in the first direction X is defined as dx11, an interval between the shift register units 30B and 30C in the first direction X is defined as dx12, an interval between the shift register units 30A and 30B in the second direction Y is defined as dy11, and an interval between the shift register units 30B and 30C in the second direction Y is defined as dy12. In this case, the intervals dx11 and dx12 are different from each other in the example shown in FIG. 4. More specifically, since dx11 is smaller than dx12 and the shift register units 30A and 30B are not displaced in the first direction X, interval dx11 is zero. Furthermore, the intervals dy11 and dy12 are different from each other in the example shown in FIG. 4. More specifically, dy11 is smaller than dy12. In the other example, the shift register units 30A, 30B, and 30C may be disposed such that dx11 is larger than dx12 or that dy11 is larger than or equal to dy12.

Similarly to the intervals dx11 and dx12, an interval between the buffer units 40A and 40B in the first direction X is different from an interval between the buffer units 40B and 40C in the first direction X, in the example shown in FIG. 4. In addition, similarly to the intervals dy11 and dy12, an interval between the buffer units 40A and 40B in the second direction Y is different from an interval between the buffer units 40B and 40C in the second direction Y. The buffer units 40A, 40B, and 40C are disposed in a step shape such that the intervals to the corner portion C31 in the first direction X are substantially the same as one another.

Furthermore, explanation will be focused on, for example, selector units 50A, 50B, and 50C, of the selector units 50. The selector units 50A and 50B are adjacent to each other and the selector units 50B and 50C are adjacent to each other. The selector units 50A, 50B, and 50C are displaced from one another in the first direction X and the second direction Y. The selector unit 50A is located on a side closer to the end portion of the signal line driver SD than to the selector unit 50B, and the selector unit 50B is located on a side closer to the end portion of the signal line driver SD than to the selector unit 50C. A width of the selector unit 50A in the first direction X is smaller than a width of the selector unit 50C.

An interval between the selector units 50A and 50B in the first direction X is defined as dx21, an interval between the selector units 50B and 50C in the first direction X is defined as dx22, an interval between the selector units 50A and 50B in the second direction Y is defined as dy21, and an interval between the selector units 50B and 50C in the second direction Y is defined as dy22. In this case, the intervals dx21 and dx22 are different from each other in the example shown in FIG. 4. More specifically, dx21 is smaller than dx22. In addition, the intervals dy21 and dy22 are approximately equal to each other in the example shown in FIG. 4. In the other example, the selector units 50A, 50B, and 50C may be disposed such that dx21 is larger than or equal to dx22 or that the intervals dy21 and dy22 are different from each other. The selector units 50A, 50B, and 50C are disposed in a step shape such that the intervals to the corner portion C31 in the second direction Y are substantially the same as one another.

Thus, the scanning line driver GD1 of the layout curved in an arcuate shape along the corner portion C31 can be implemented by adjusting the intervals of the shift register units 30 and the buffer units 40 in the X direction and the Y direction, at positions close to the corner portion C31. Similarly, the signal line driver SD of the layout curved in an arcuate shape along the corner portion C31 can be implemented by adjusting the intervals of the selector units 50 in the X direction and the Y direction, at positions close to the corner portion C31.

In the above explanations, each of the intervals (dx11, dx12, dx21, dx22, and the like) of two adjacent units in the first direction X corresponds to an interval between centers of the units in the first direction X. In addition, each of the intervals (dy11, dy12, dy21, dy22, and the like) of two adjacent units in the second direction Y corresponds to an interval between centers of the units in the second direction Y.

The configuration of the scanning line driver GD1 at a position close to the corner portion C33 of the display area DA shown in FIG. 1 is similar to the configuration of the scanning line driver GD1 at a position close to the corner portion C31. In addition, the configurations of the scanning line driver GD2, the signal line driver SD, and the video line group VG, and the leads L1 is similar to their configurations at positions close to the corner portion C31. Furthermore, the configuration of the scanning line driver GD2 at a position close to the corner portion C34 of the display area DA is similar to the configuration of the scanning line driver GD1 at a position close to the corner portion C33. The configuration of the peripheral area SA at a position close to the corner portions C31 to C34 is not limited to this example, but can be arbitrarily changed by considering the layout of the disposed circuits and lines.

Next, a concrete configuration example of the common electrodes CE shown in FIG. 2 will be explained with reference to the plan view of FIG. 5. The members at positions close to the corner portion C31 which is a round portion will be explained. Common electrodes CE0, CE1, CE2, CE3, . . . are arranged in this order in the first direction X and extend in the second direction Y. In the example illustrated, the common electrodes CE0 and CE3 are wider than the common electrodes CE1 and CE2 and, for example, a width W0 of the common electrode CE0 in the first direction X is approximately double a width W1 of the common electrode CE1. By employing the common electrodes of the above widths, in a sensor function capable of changing the mutual-capacitive mode and the self-capacitive mode, sensor centers in both of the modes can be made to match and the unbalance of capacitance in the common electrodes in the self-capacitive mode can be improved, though not explained in detail.

A switch unit 60 is connected to the common electrode CE0, a switch unit 61 is connected to the common electrode CE1, switch unit 62 is connected to the common electrode CE2, and switch unit 63 is connected to the common electrode CE3. Each of the switch units 60 to 63 is surrounded by a dotted line in the figure. Each of the switch units 60 to 63 selectively supplies a first drive signal or a second drive signal to the common electrode connected to the switch unit. The second drive signal is different from the first drive signal. For example, the first drive signal is a DC common signal necessary to display an image in the display area DA. The second drive signal is an alternating drive signal necessary to detect an object.

Each of the common electrodes CE0, CE1, and CE2 comprises an edge shaped in a step shape along the corner portion C31. As explained above, the scanning line driver GD1 is provided in the area curved along the corner portion C31 and supplies the scanning signal to the scanning line G at a position close to the edge EDA1, in the display area DA. All of the switch units are disposed in areas different from the scanning line driver GD1. For this reason, the common electrode CE0 and the switch unit 60 cannot be arranged in the second direction Y, and the scanning line driver GD1 and the common electrode CE0 are arranged in the second direction Y. The common electrode CE1 and the switch unit 60 are arranged in the second direction Y and, similarly, the common electrode CE2 and the switch unit 61 are arranged in the second direction Y. In addition, a part of the switch unit 62 and the common electrode CE2 are arranged in the second direction Y, and the other parts of the switch unit 62 and the common electrode CE3 are arranged in the second direction Y. Most parts of the switch unit 63 and the common electrode CE3 are arranged in the second direction Y.

Explanation will be focused on the switch units 61 and 62. The switch unit 61 comprises switch circuits 611, 612, . . . arranged in the second direction Y. The switch unit 62 comprises switch circuits 621, 622, . . . arranged in the first direction X. In the switch unit 62, the switch circuits 621 to 623 and the common electrode CE2 are arranged in the second direction Y. The switch circuits 624 and 625 and the common electrode CE3 are arranged in the second direction Y. The configurations and the functions of the switch circuits are substantially the same and will be explained later. Each of the switch circuits is represented by upward-sloping hatch lines in the figure. As regards intervals between a sealing member SL and the corner portion C31 in the second direction Y, an interval W61 including an area where the switch unit 61 is disposed is larger than an interval W62 including an area where the switch unit 62 is disposed. For this reason, the switch unit 61 is suitable for arrangement of the switch circuits in the second direction Y.

For example, the common electrode CE1 corresponds to the first common electrode, the common electrode CE2 corresponds to the second common electrode, the switch unit 61 corresponds to the first switch unit, the switch unit 62 corresponds to the second switch unit, the switch circuit 611 corresponds to the first switch circuit, the switch circuit 612 corresponds to the second switch circuit, the switch circuit 621 corresponds to the third switch circuit, and the switch circuit 622 corresponds to the fourth switch circuit.

Portions represented by the downward-sloping hatch lines in the figure correspond to the selector circuits 51. The video lines V are connected to the selector circuits 51, respectively. The selector circuits 51 and the video lines V do not overlap the common electrodes. In other words, the common electrodes CE0 to CE3 extend to not only the display area DA, but also the peripheral area SA, but do not extend to the side closer to the sealing member SL than to the position overlapping the selector circuit 51 disposed in the peripheral area SA. For this reason, the common electrodes CE0 to CE3 do not overlap the video line V located on the side closer to the sealing member SL than to the selector circuit 51, and suppress undesired capacitance formation between the video line V and the common electrodes.

In the example illustrated, the switch units 60 and 61 do not intersect any video lines V. The switch unit 62 intersects the video line V. For example, when attention is focused on the selector circuit adjacent to the common electrode CE2, the selector circuit 51A is located between the switch unit 61 and the common electrode CE2. A video line VA connected to the selector circuit 51A is located between the switch units 61 and 62. A selector circuit 51B is located between the switch unit 62 and the common electrode CE2. A video line VB connected to the selector circuit 51B is located between the switch circuits 621 and 622 of the switch unit 62.

FIG. 6 is a diagram showing a configuration example of a switch unit 61. For example, the switch unit 61 comprises switch circuits 611 to 614. The switch circuits 611 to 614 are arranged in the second direction Y. Since the switch circuits 611 to 614 have substantially the same configuration, the switch circuit 611 will be particularly explained in more detail.

The switch circuit 611 comprises the switches SW1 and SW2. The switches SW1 and SW2 are arranged in the second direction Y. In the present specification, a switch supplying the first drive signal to the common electrode is called a first switch, and a switch supplying the second drive signal to the common electrode is called a second switch. In FIG. 6, the switch SW1 corresponds to the first switch and the switch SW2 corresponds to the second switch. An end of the switch SW1 is connected to an end of the switch SW2 and also connected to the common electrode CE1. The other end of the switch SW1 is connected to a first drive signal line VCOMDC to which the first drive signal is supplied. The other end of the switch SW2 is connected to a second drive signal line TSVCOM to which the second drive signal is supplied. The switches SW1 and SW2 are controlled by select signals supplied from select signal lines (not shown). For example, if the switch SW1 becomes conductive and the switch SW2 becomes nonconductive, based on the first select signal, the first drive signal is supplied to the common electrode CE1. If the switch SW2 becomes conductive and the switch SW1 becomes nonconductive, based on the second select signal, the second drive signal is supplied to the common electrode CE1. In the present specification, the first switch and the second switch are paired, and a circuit supplying the first drive signal and the second drive signal to the common electrode is called a switch circuit.

A unit composed of switch circuits is called a switch unit, and the number of the switch circuits in the switch unit 61 is not limited to four in the example illustrated. In addition, the layout of the switch circuits in the switch unit 61 is not limited to the example illustrated. The signal lines S which overlap the common electrode CE1 are connected to the selector circuits 51. The video lines V connected to the respective selector circuits 51 are provided in the surrounding of the switch unit 61 without being located between the switch circuits of the switch unit 61.

Figure 7:
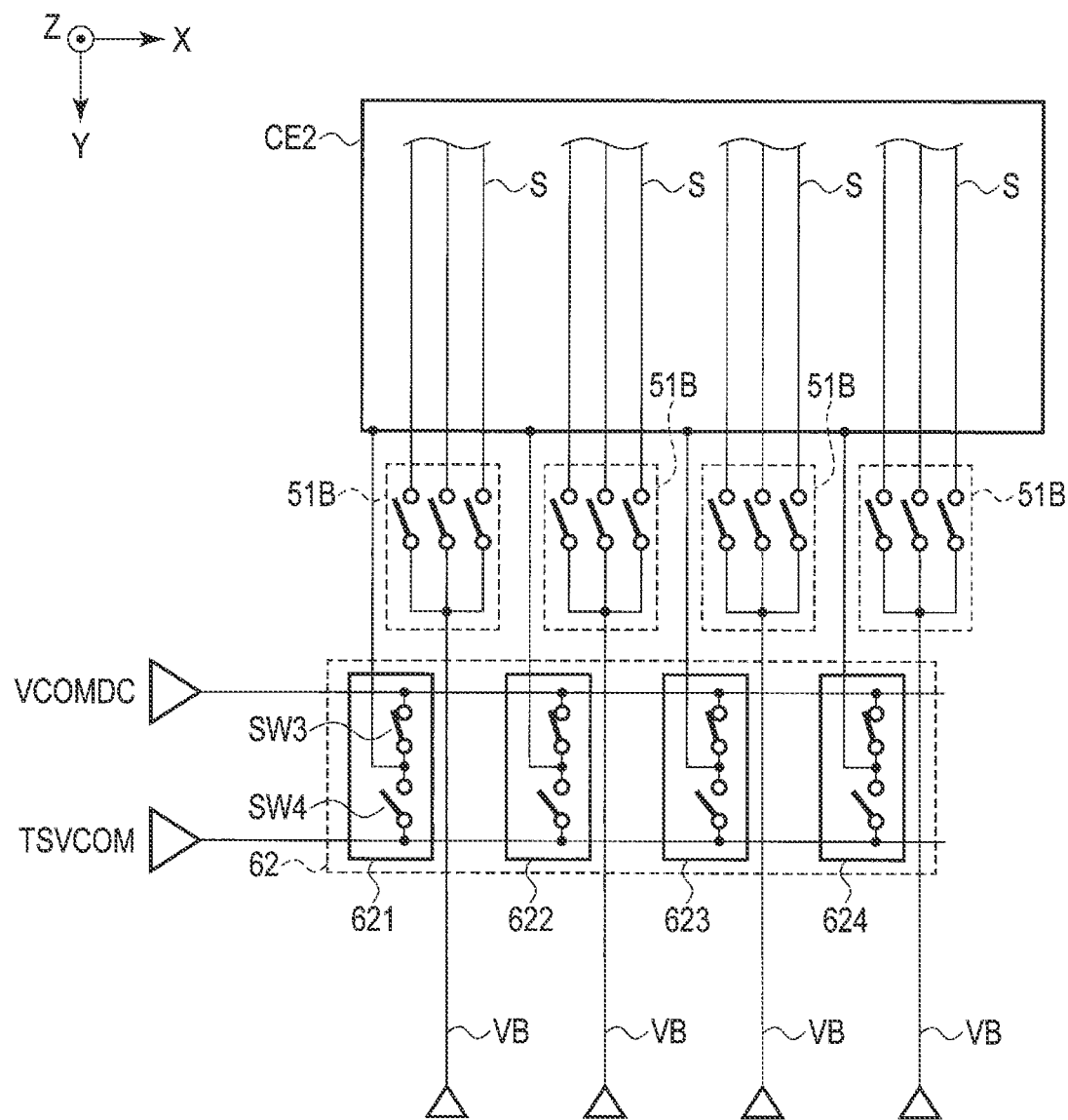
FIG. 7 is a diagram showing a configuration example of a switch unit 62.

FIG. 7 is a diagram showing a configuration example of a switch unit 62. For example, the switch unit 62 comprises switch circuits 621 to 624. The switch circuits 621 to 624 are arranged in the first direction X. Since the switch circuits 621 to 624 have substantially the same configuration, the switch circuit 621 will be particularly explained in more detail.

The switch circuit 621 comprises switches SW3 and SW4. The switches SW3 and SW4 are arranged in the second direction Y. For example, the switch SW3 corresponds to the first switch and the switch SW4 corresponds to the second switch. An end of the switch SW3 is connected to an end of the switch SW4 and also connected to the common electrode CE2. The other end of the switch SW3 is connected to the first drive signal line VCOMDC. The other end of the switch SW4 is connected to the second drive signal line TSVCOM. The switches SW3 and SW4 are controlled by select signals supplied from select signal lines (not shown). An operation of the switch circuit 621 is the same as the operation of the switch circuit 611 explained with reference to FIG. 6.

The signal lines S which overlap the common electrode CE2 are connected to the selector circuit 51B. A video line VB connected to the selector circuit 51B is located between the adjacent switch circuits of the switch unit 62.

Figure 8:
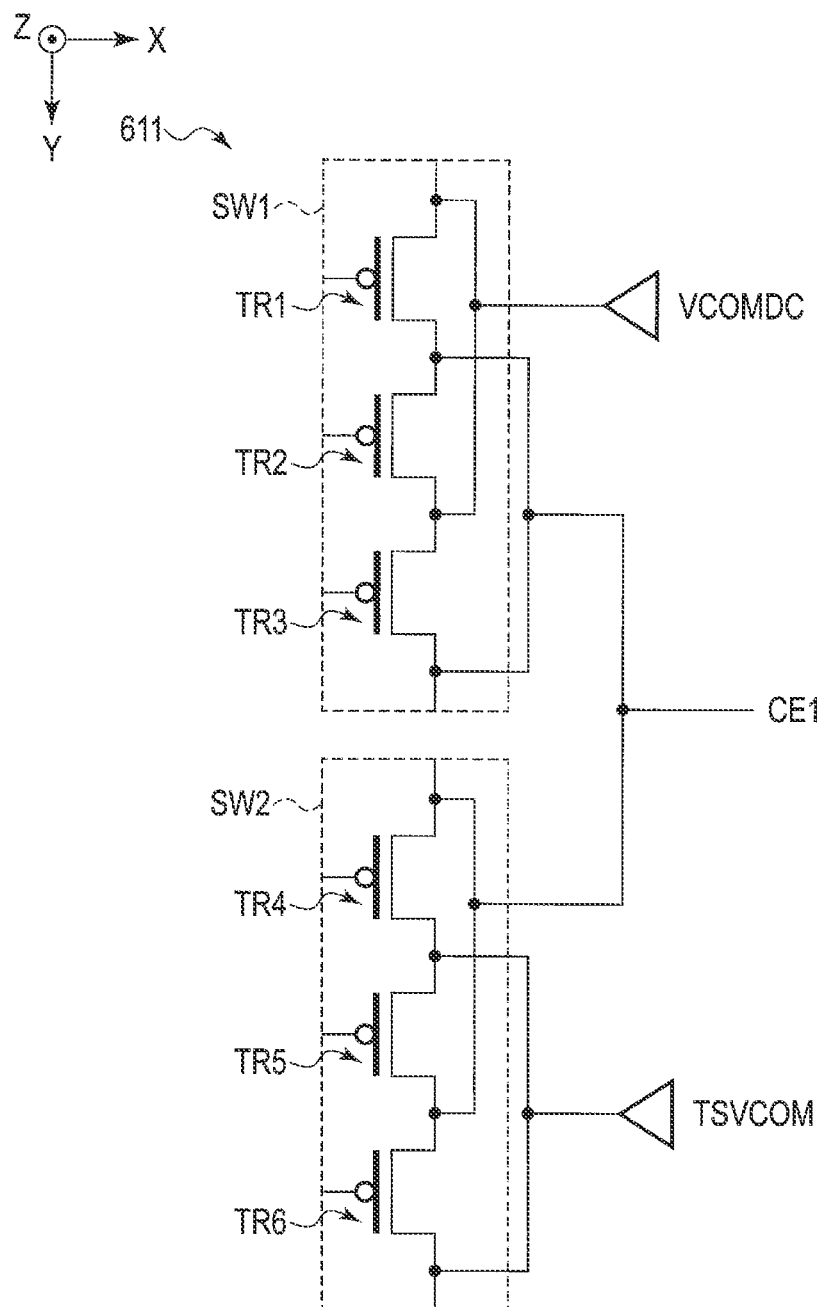
FIG. 8 is a diagram showing a configuration example of a switch circuit.

FIG. 8 is a diagram showing a configuration example of a switch circuit. The switch circuit 611 will be explained as an example, but the same configuration can also be employed in the other switch circuits. The switch SW1 comprises parallel-connected first to third transistors TR1 to TR3. The switch SW2 comprises parallel-connected fourth to sixth transistors TR4 to TR6. The first to sixth transistors TR1 to TR6 are arranged in the second direction Y.

An input terminal of each of the first to third transistors TR1 to TR3 is connected to the first drive signal line VCOMDC. An output terminal of each of the first to third transistors TR1 to TR3 is connected to the common electrode CE1. An input terminal of each of the fourth to sixth transistors TR4 to TR6 is connected to the second drive signal line TSVCOM. An output terminal of each of the fourth to sixth transistors TR4 to TR6 is connected to the common electrode CE1.

Thus, the members at positions close to the corner portion C31 are subjected to restriction in layout in the display device in which the corner portion C31 is the round portion, but narrowing the frame of the display device DSP can be implemented by effectively using the space of the peripheral area SA. For example, at the position close to the corner portion C31, the switch unit for selectively supplying the first drive signal and the second drive signal to the common electrode CE is often subjected to the restriction in layout that the switch unit cannot be disposed at the position close to the common electrode and cannot help being disposed so as to be arranged with the adjacent common electrode CE. As explained with reference to FIG. 5, for example, the switch unit 61 connected to the common electrode CE1, and the common electrode CE2 are arranged in the second direction Y. The switch unit 61 comprises the switch circuits 611, 612, . . . and the switch circuits 611, 612, . . . are arranged in the second direction Y. For this reason, the width of the switch unit 61 in the first direction X is smaller than that in a case where the switch circuits 611, 612, . . . are arranged in the first direction X. The switch unit 61 is disposed in a space wide in the second direction Y as formed by the corner portion C31. Therefore, the space of the peripheral area SA can be used effectively and narrowing the frame can be implemented.

Figure 9:
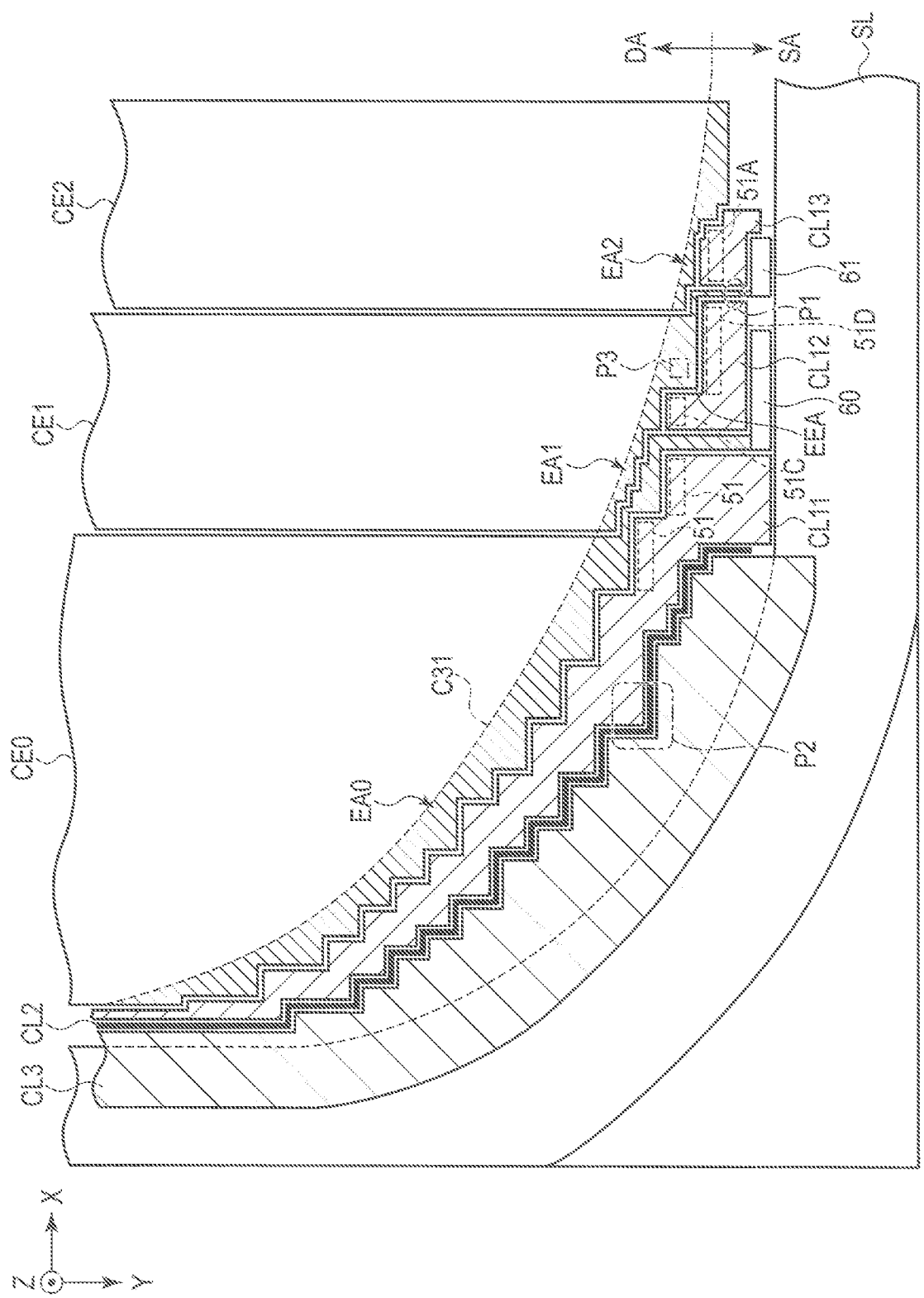
FIG. 9 is a plan view for explanation of the common electrodes at the positions close to the corner C31 and their peripheral structure.

FIG. 9 is a plan view for explanation of the common electrodes at the positions close to the corner C31 and their peripheral structure.

The common electrodes CE0, CE1, and CE2 include extending portions EA0, EA1, and EA2 extending to the peripheral area SA, respectively. As explained above, the common electrodes CE0, CE1, and CE2 do not overlap the selector circuit 51, but edges of the extending portions EA0, EA1, and EA2 are formed in a step shape in which portions extending in the first direction X and portions extending in the second direction Y repeat alternately.

Explanation will be focused on a relationship between the extending portion EA1 and the selector circuits 51C and 51D. For example, the selector circuit 51C corresponds to the first selector circuit, and the selector circuit 51D corresponds to the second selector circuit. The selector circuit 51C is closer to the display area DA than to the selector circuit 51D. The extending portion EA1 is located between the display portion DA and the selector circuits 51C and 51D. An edge EEA of the extending portion EA1 is formed in a step shape along the selector circuits 51C and 51D.

First conductive layers CL11 to CL13 are located between the common electrodes CE0, CE1, and CE2 and the sealing member SL. The first conductive layers CL11 to CL13 are supplied with a fixed potential, for example, the first drive signal. In other words, the first conductive layers CL11 to CL13 are electrically connected to the first drive signal line VCOMDC explained with reference to FIG. 6 and the like. The first conductive layers CL11 to CL13 may be supplied with the other fixed potentials, for example, a low potential voltage VGL, a high potential voltage VGH, and the like.

The first conductive layers CL11 to CL13 can be located in the same layer as, for example, the pixel electrodes PE explained with reference to FIG. 3 and can be formed of the same material as the pixel electrodes PE. The first conductive layers CL11 to CL13 are located in a layer different from the common electrodes CE. In the example illustrated, the first conductive layers CL11 to CL13 are remote from the common electrodes CE in planar view but may overlap the common electrodes CE. However, the first conductive layers CL11 to CL13 are often supplied with an electric potential different from that supplied to the common electrodes CE and, if the first conductive layers overlap the common electrodes, the overlapping area should preferably be as small as possible from the viewpoint of suppressing undesired capacitance formation.

The first conductive layers CL11 to CL13 overlap the selector circuits 51. For example, if explanation is focused on the first conductive layer CL12, the first conductive layer CL12 overlaps the selector circuits 51C and 51D. The first conductive layers CL suppress field leakage from the selector circuits and the other lines located in the lower layers.

Figure 10:
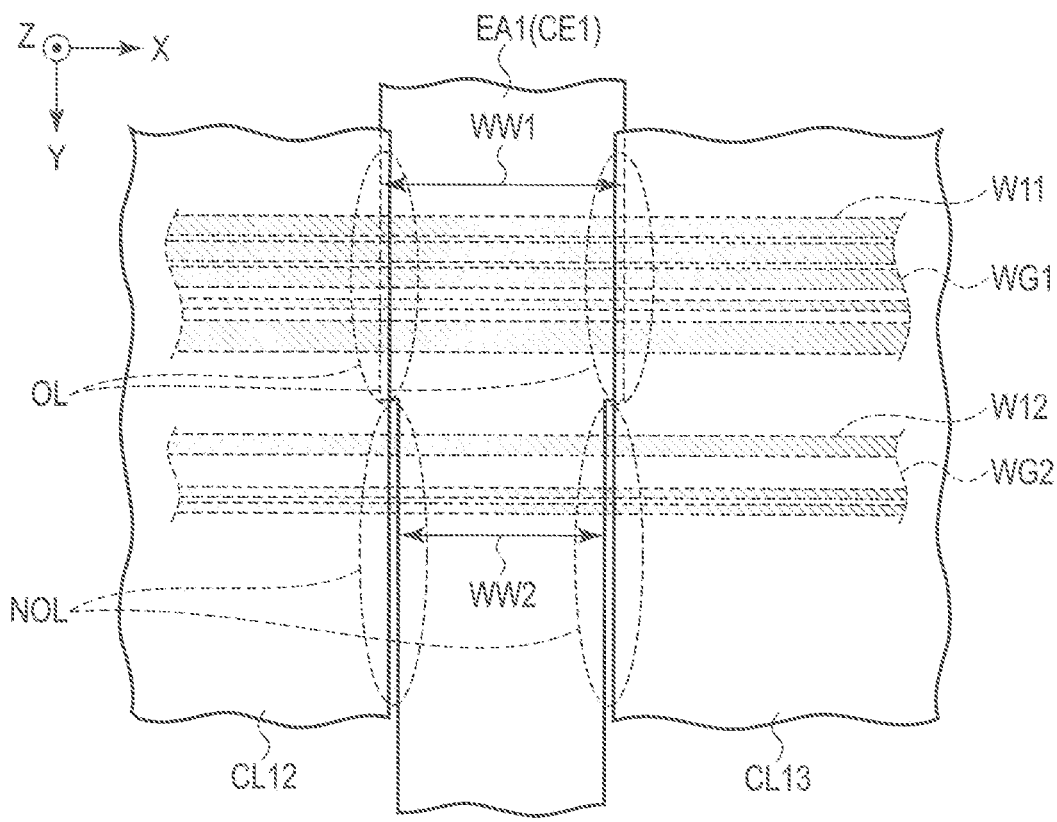
FIG. 10 is an enlarged plan view showing area P1 shown in FIG. 9.

FIG. 10 is an enlarged plan view showing area P1 shown in FIG. 9. Explanation is focused on a positional relationship between the first conductive layers CL12 and CL13 and the extending portion EA1 of the common electrode CE1. The extending portion EA1 is located between the first conductive layers CL12 and CL13. The extending portion EA1 and the first conductive layers CL12 and CL13 intersect various lines extending in the first direction X. The first conductive layers CL12 and CL13 comprise overlap portions OL which overlap the extending portion EA1 in planar view, in areas intersecting a line group WG1, and non-overlap portions NOL which are remote from the extending portion EA1 in planar view, in areas intersecting a line group WG2. The line group WG2 includes various lines W11 such as lines supplied with the low potential voltage VGL, the video lines V and the signal lines S supplied with the video signals, and the scanning lines G supplied with the scanning signals. The line group WG1 includes various lines W12 supplied with signals different from those supplied to the lines included in the line group WG2. The common electrode CE1 has a width WW1 at a portion overlapping the line W11 and a width WW2 at a portion overlapping the line W12, at the extending portion EA1. The width WW2 is smaller than the width WW1. Since the first conductive layers CL12 and CL13 and the common electrode CE1 do not overlap in the area intersecting the line group WG2 including the line W12, undesired capacitance formation can be suppressed. In addition, since the first conductive layers CL12 and CL13 and the common electrode CE1 overlap in the area intersecting the line group WG1, field leakage from the line group WG1 can be suppressed.

The example will be explained again with reference to FIG. 9. The second conductive layer CL2 and the third conductive layer CL3 are disposed at positions different from the first conductive layers CL11 to CL13 in the peripheral area SA. In the example illustrated, the second conductive layer CL2 is located between the first conductive layer CL11 and the sealing member SL. The third conductive layer CL3 is located between the second conductive layer CL2 and the sealing member SL, and partially overlaps the sealing member SL. The electric potentials of the second conductive layer CL2 and the third conductive layer CL3 are different from the electric potential of the first conductive layer CL11. The second conductive layer CL2 and the third conductive layer CL3 are supplied with a fixed potential, for example, the low potential voltage VGL. The field leakage from various lines located in the layers lower than the second conductive layer CL2 and the third conductive layer CL3 can be thereby suppressed in the peripheral area SA.

The second conductive layer CL2 and the third conductive layer CL3 can be located in the same layer as, for example, the pixel electrodes PE explained with reference to FIG. 3 and can be formed of the same material as the pixel electrodes PE. In other words, the first conductive layer CL11, the second conductive layer CL2, and the third conductive layer CL3 are located in the same layer and located in the layer different from the common electrodes CE. The second conductive layer CL2 is remote from the first conductive layer CL11. For example, if the second conductive layer CL2 and the third conductive layer CL3 are supplied with the low potential voltage VGL, impurities of cations contained in the liquid crystal layer LC can be collected in the peripheral area SA since the electric potentials of the second conductive layer CL2 and the third conductive layer CL3 are lower than the electric potential of the first conductive layer CL11.

Figure 11:
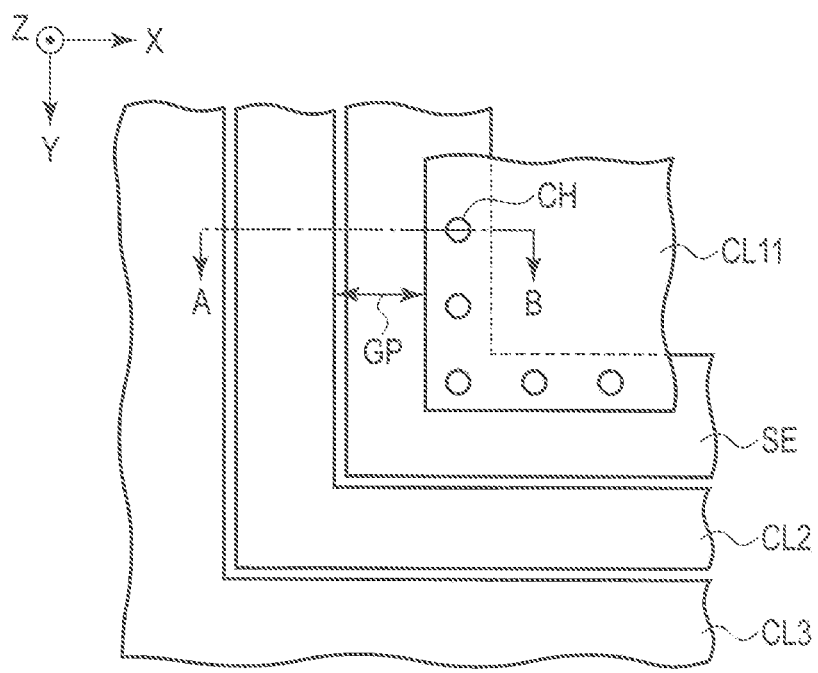
FIG. 11 is an enlarged plan view showing area P2 shown in FIG. 9.

FIG. 11 is an enlarged plan view showing area P2 shown in FIG. 9. Explanation will be focused on a positional relationship between the first conductive layer CL11 and the second conductive layer CL2. As explained above, the first conductive layer CL11 and the second conductive layer CL2 are remote from each other since the conductive layers may have different electric potentials. A shield electrode SE is disposed in a gap GP between the first conductive layer CL11 and the second conductive layer CL2. The shield electrode SE partially overlaps the first conductive layer CL11 and is electrically connected to the first conductive layer CL11 via a contact hole CH.

Figure 12:
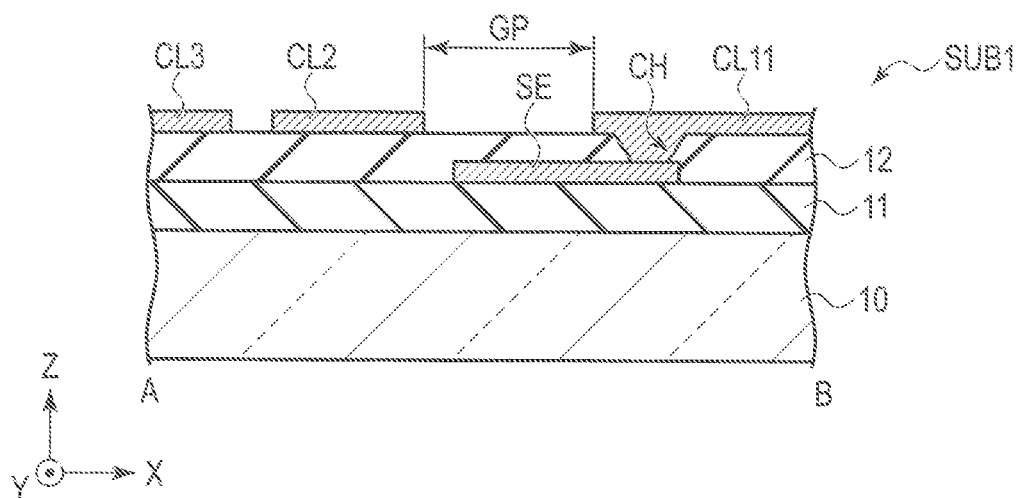
FIG. 12 is a cross-sectional view showing first substrate SUB1 seen along line A-B in FIG. 11.

FIG. 12 is a cross-sectional view showing first substrate SUB1 seen along line A-B in FIG. 11. The first conductive layer CL11, the second conductive layer CL2, and the third conductive layer CL3 are located on the second insulating layer 12, and located in the same layer as the pixel electrodes PE explained with reference to FIG. 3. The shield electrode SE is located between the first insulating layer 11 and the second insulating layer 12, and is located in the same layer as the common electrodes CE explained with reference to FIG. 3. For this reason, the shield electrode SE can be formed of the same material as the common electrodes CE. The first conductive layer CL11 is connected to the shield electrode SE via the contact hole CH penetrating the second insulating layer 12. The field leakage from various lines can also be thereby suppressed in the gap GP between than the first conductive layer CL11 and the second conductive layer CL2.

Figure 13:
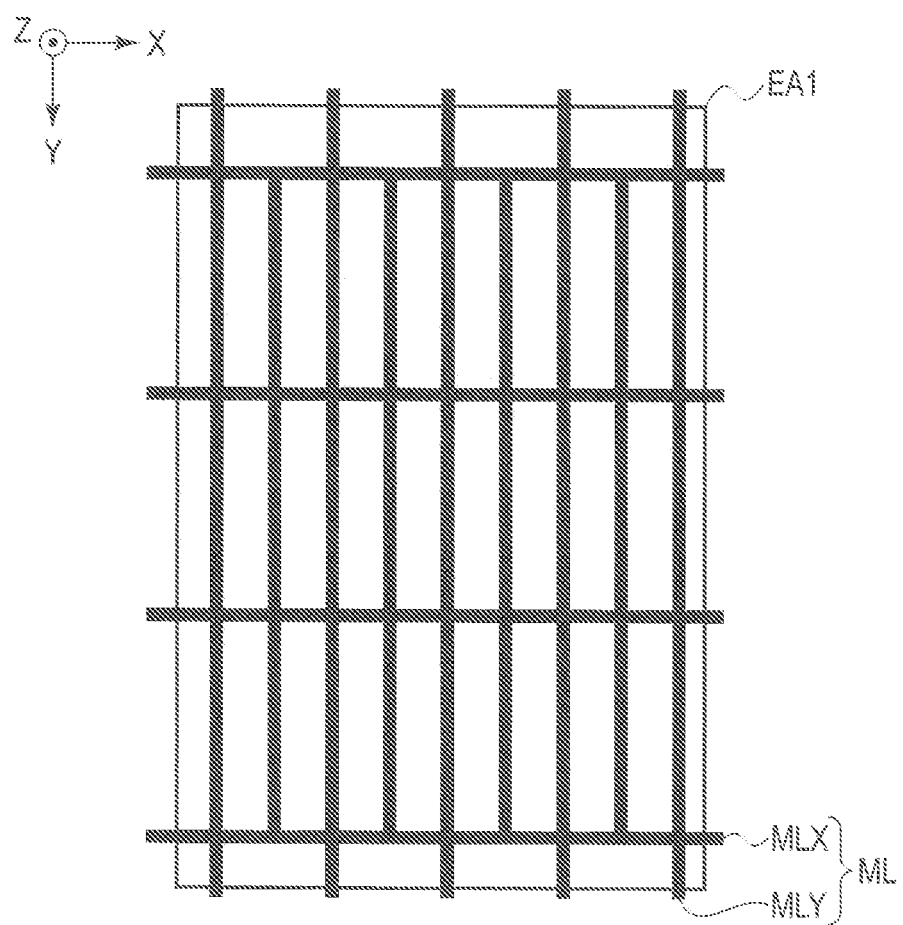
FIG. 13 is an enlarged plan view showing area P3 shown in FIG. 9.

FIG. 13 is an enlarged plan view showing area P3 shown in FIG. 9. The extending portion EA1 is partially enlarged in the figure. The extending portion EA1 is electrically connected to the metal layer ML. The metal layer ML is formed in, for example, a grating shape including portions MLX extending in the first direction X and portions MLY extending in the second direction Y. For example, the metal layer ML is in direct contact with the extending portion EA1. An insulating layer may be intervened between the metal layer ML and the extending portion EA1, and the metal layer ML and the extending portion EA1 may be in contact with each other via a contact hole penetrating the insulating layer. This metal layer ML selectively supplies the first drive signal and the second drive signal to the common electrode CE1 which is connected to the switch unit 61 shown in FIG. 9 and which includes the extending portion EA1. For this reason, even if the common electrode CE1 and the switch unit 61 are disposed remote from each other as shown in FIG. 9, a desired signal can be supplied to the common electrode CE1.

In addition, as clarified with reference to FIG. 9, the common electrode CE0 and the switch unit 60 are disposed more remote from each other than the common electrode CE1 and the switch unit 61 are. The extending portion EA0 of the common electrode CE0 is electrically connected to the metal layer ML similarly to the extending portion EA1 shown in FIG. 13, and a desired signal can be supplied from the switch unit 60 to the common electrode CE0.

Figure 14:
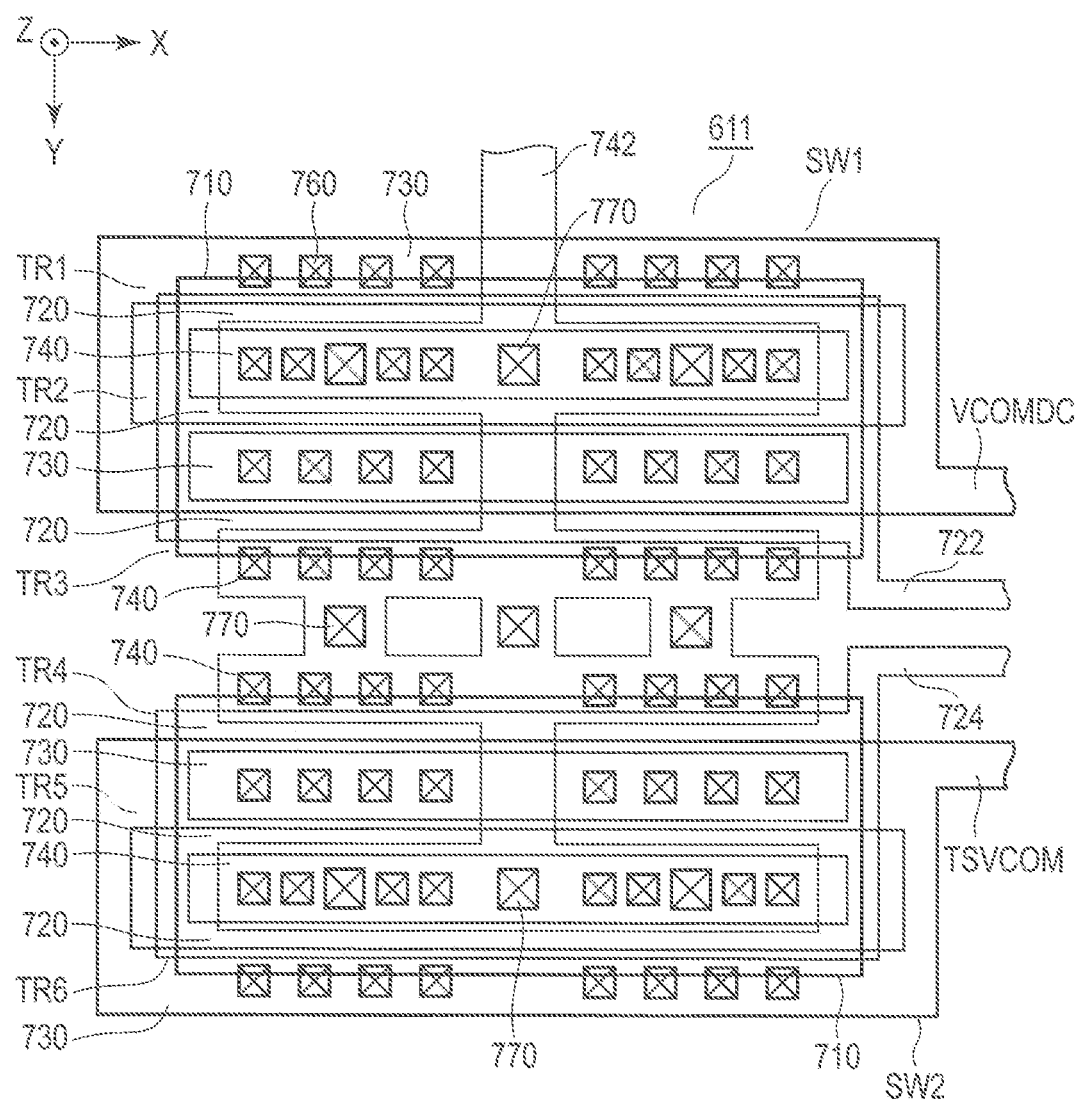
FIG. 14 is a diagram showing layout of switch circuit 611 shown in FIG. 8.

Next, a layout of the switch circuit 611 shown in FIG. 8 is shown in FIG. 14. The switch circuit 611 comprises the switches SW1 and SW2. The switches SW1 and SW2 are arranged in the second direction Y similarly to FIG. 8. The switch SW1 includes the first transistor TR1, the second transistor TR2, and the third transistor TR3. The switch SW2 includes the fourth transistor TR4, the fifth transistor TR5, and the sixth transistor TR6.

The switch SW1 includes a semiconductor layer 710 having an approximately rectangular shape, and longer sides of the semiconductor layer 710 extend in the first direction X. The semiconductor layer 710 is formed sequentially from the first transistor TR1 to the third transistor TR3 in the second direction Y. Similarly, the switch SW2 also includes a semiconductor layer 710 having an approximately rectangular shape. Each of the first transistor TR1 to sixth transistor TR6 includes a gate electrode 720, a drain electrode 730, and a source electrode 740. The gate electrode 720, the drain electrode 730, and the source electrode 740 extend in the first direction X and are arranged in the second direction Y.

The drain electrode 730 of the first transistor TR1 is connected to the first drive signal line VCOMDC, and is electrically connected to a drain area of the semiconductor layer 710 via contact holes 760. The gate electrode 720 is formed in parallel with the drain electrode 730 of the first transistor TR1. The gate electrode 720 is connected to a first select signal line 722. The first transistor TR1 and the second transistor TR2 include a common source electrode 740. The source electrode 740 is electrically connected to a source area of the semiconductor layer 710 through the contact holes 760 and is electrically connected to an output signal line 742 through contact holes 770. The output signal line 742 is connected to the common electrode CE1 as shown in FIG. 8. The second transistor TR2 and the third transistor TR3 of the switch SW1 include a common drain electrode 730. The source electrode 740 of the third transistor TR3 is electrically connected to the output signal line 742 through the contact holes 770. The outer shape of the source electrode 740 overlaps the outer shape of the output signal line 742 and, in FIG. 14, the source electrode 740 and the output signal line 742 have the same outer shape to simplify the figure.

The source electrode 740 of the third transistor TR3 is electrically connected to the output signal line 742 through the contact holes 770, and the contact holes 770 are also formed between the switches SW1 and SW2 to make electric connection between the source electrode 740 and the output signal line 742. In addition, the switch SW2 is formed to have line symmetry with the switch SW1 with respect to the contact holes 770.

The fourth transistor TR4 and the fifth transistor TR5 of the switch SW2 include a common drain electrode 730. The drain electrode 730 of the fourth transistor TR4 and the fifth transistor TR5 is connected to the second drive signal line TSVCOM and is supplied with the second drive signal. The fifth transistor TR5 and the sixth transistor TR6 include a common source electrode 740. The source electrode 740 of the fifth transistor TR5 and the sixth transistor TR6 is connected to the output signal line 742 through the contact holes 770. The drain electrode 730 of the sixth transistor TR6 is connected to the second drive signal line TSVCOM and is supplied with the second drive signal.

In each of the switches SW1 and SW2, three transistors are arranged in the second direction Y, but the source electrodes 740 or the drain electrodes 730 of the adjacent transistors are commonly formed to attempt reduction in the formation area in the second direction Y. Furthermore, the contact holes 770 are formed between the switches SW1 and SW2, and the contact holes 770 are not formed at the source electrodes 740 of the transistors TR3 and TR4, to attempt reduction in size of the source electrodes 740 in the second direction Y. If the contact holes 770 are formed to overlap the source electrodes 740, the width of the source electrode 740 is increased in the second direction Y since the outer shape of the contact holes 770 is larger than the outer shape of the contact holes 760, but the width of the source electrodes 740 of the third transistor TR3 and the fourth transistor TR4 in the second direction can be narrowed as compared with a case where the contact holes 770 overlap the source electrode 740, by providing the contact holes 770 between the switches SW1 and SW2.

Furthermore, by forming the switches SW1 and SW2 to have line symmetry, the source electrodes 740 of the third transistor TR3 and the fourth transistor TR4 can be formed to be closer to one another and the contact holes 770 can be formed between the switches SW1 and SW2.

Next, a modified example of the switch unit 61 shown in FIG. 6 will be explained with reference to FIG. 15 to FIG. 18. In FIG. 15, in a switch unit 61B, first switches SW11 and SW12 outputting the first drive signals are formed to be adjacent to each other in the second direction Y, and second switches SW21 and SW22 outputting the second drive signals are formed to be adjacent to each other in the second direction Y. Output terminals of the switches are commonly connected to an output signal line 842, and the output signal line 842 is connected to the common electrode CE1.

In the switch unit 61B shown in FIG. 15, the first switch and the second switch are not paired to form a switch circuit, unlike the switch unit 61 shown in FIG. 6. In the switch unit 61B, a pair of a first switch group and a second switch group composed of transistors on plural stages form the switch unit. Therefore, in the switch unit 61B, the switch circuits do not constitute the switch unit but, for convenience, the paired first switch group and second switch group are also called the switch unit.

Figure 5:
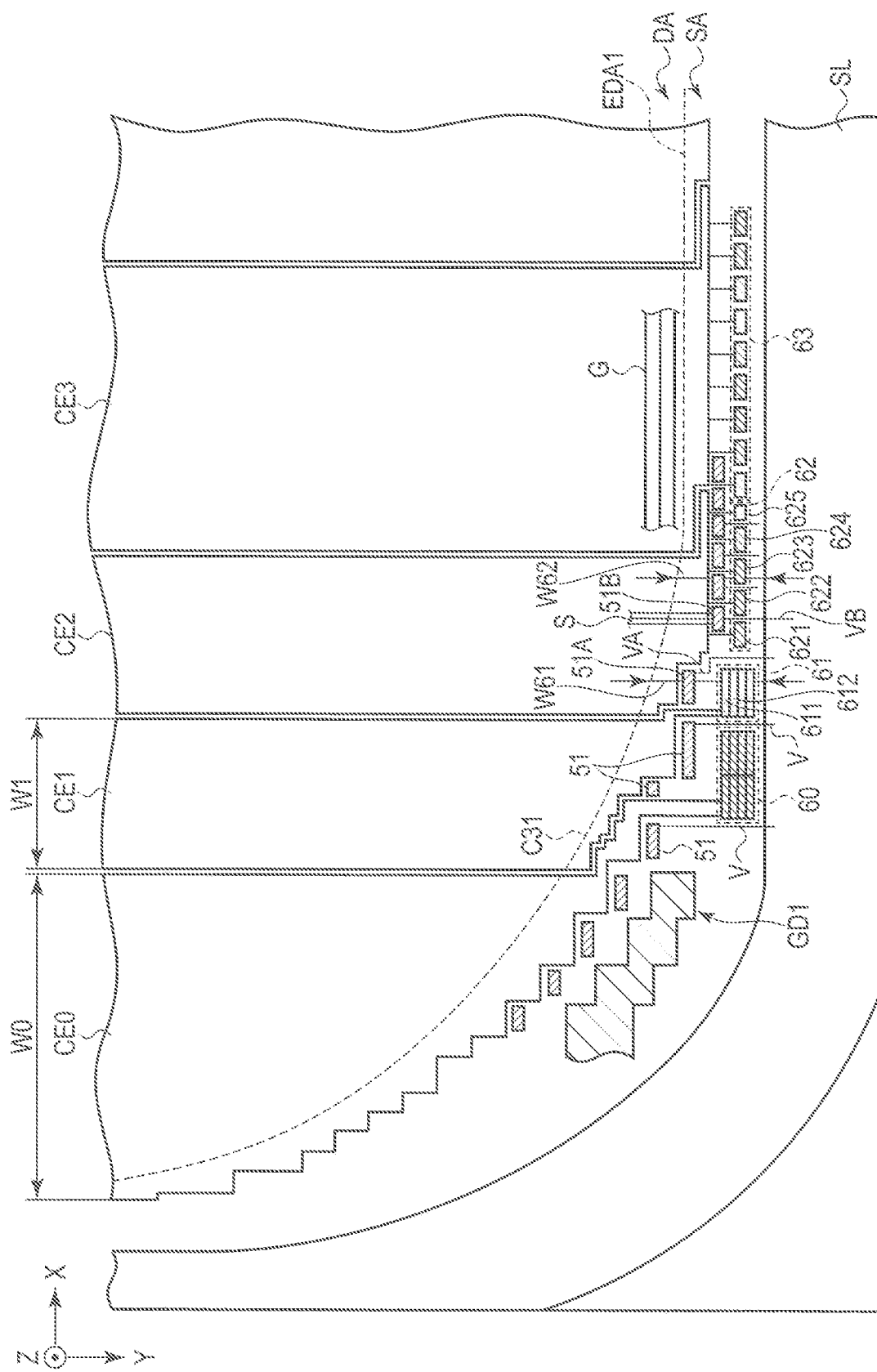
FIG. 5 is a plan view showing a configuration example of the common electrodes CE shown in FIG. 2.

In FIG. 15, an imaginary line 633 representing an upper end (where the display area DA side is called an upper side in the figure) of the selector circuit 51B shown in FIG. 5 is drawn to explain a positional relationship between the switch units. A lower edge of the selector circuit 51A is formed to be closer to the display area DA side than to the upper end of the selector circuit 51B represented by the imaginary line 633. In other words, as shown in FIG. 5, the lower end of the common electrode CE2 is located more closely to the display area DA side than to the lower end of the common electrode CE3 and, in accordance with the location, the space to form the switch units 61 and 61B is expanded in the second direction Y. Therefore, the width of the switch units 61 and 61B in the second direction Y can be expanded, the switch circuits can be arranged in four stages in the switch unit 61, and the first switches can be arranged in two stages and the second switches can be arranged at two stages in the switch unit 61B.

Next, a circuit diagram of the switch unit 61B will be explained with reference to FIG. 16. In the switch unit 61B, the first switches outputting the first drive signals are formed to overlap at two stages in the second direction Y, and the second switches outputting the second drive signals are formed to overlap at two stages in the second direction Y.

The switch SW11 comprises a first transistor TR11, a second transistor TR12, a third transistor TR13, and a fourth transistor TR14, which are parallel-connected. The configuration inside the switch SW12 will not be explained but the configuration of the switch SW12 is the same as that of the switch SW11. The switch SW21 comprises a fifth transistor TR21, a sixth transistor TR22, a seventh transistor TR23, and an eighth transistor TR24, which are parallel-connected. The configuration inside the switch SW22 will not be explained but the configuration of the switch SW22 is the same as that of the switch SW21.

An input terminal of each of the first to fourth transistors TR11 to TR14 is connected to the first drive signal line VCOMDC, and an output terminal of each of the transistors is connected to the common electrode CE1 via an output signal line 842. To form the transistors at four stages, input terminals of the second transistor TR12 and the third transistor TR13 are commonly connected to the first drive signal line VCOMDC, output terminals of the first transistor TR11 and the second transistor TR12 are commonly connected to the output signal line 842, and output terminals of the third transistor TR13 and the fourth transistor TR14 are commonly connected to the output signal line 842.

In addition, an input terminal of each of the fifth to eighth transistors TR21 to TR24 is connected to the second drive signal line TSVCOM, and an output terminal of each of the transistors is connected to the common electrode CE1 via the output signal line 842. To form the transistors at four stages, input terminals of the sixth transistor TR22 and the seventh transistor TR23 are commonly connected to the second drive signal line TSVCOM, output terminals of the fifth transistor TR21 and the sixth transistor TR22 are commonly connected to the output signal line 842, and output terminals of the seventh transistor TR23 and the eighth transistor TR24 are commonly connected to the output signal line 842.

A control terminal of each of the first to fourth transistors TR11 to TR14 is connected to the first select signal line 722, and a control terminal of each of the fifth to eighth transistors TR21 to TR24 is connected to the second select signal line 724. Therefore, each of the first to fourth transistors TR11 to TR14 is controlled to be turned on and off by the first select signal line 722, and outputs the first drive signal to the common electrode CE1, in the on state. In addition, each of the fifth to eighth transistors TR21 to TR24 is controlled to be turned on and off by the second select signal line 724, and outputs the second drive signal to the common electrode CE1, in the on state.

Figure 17:
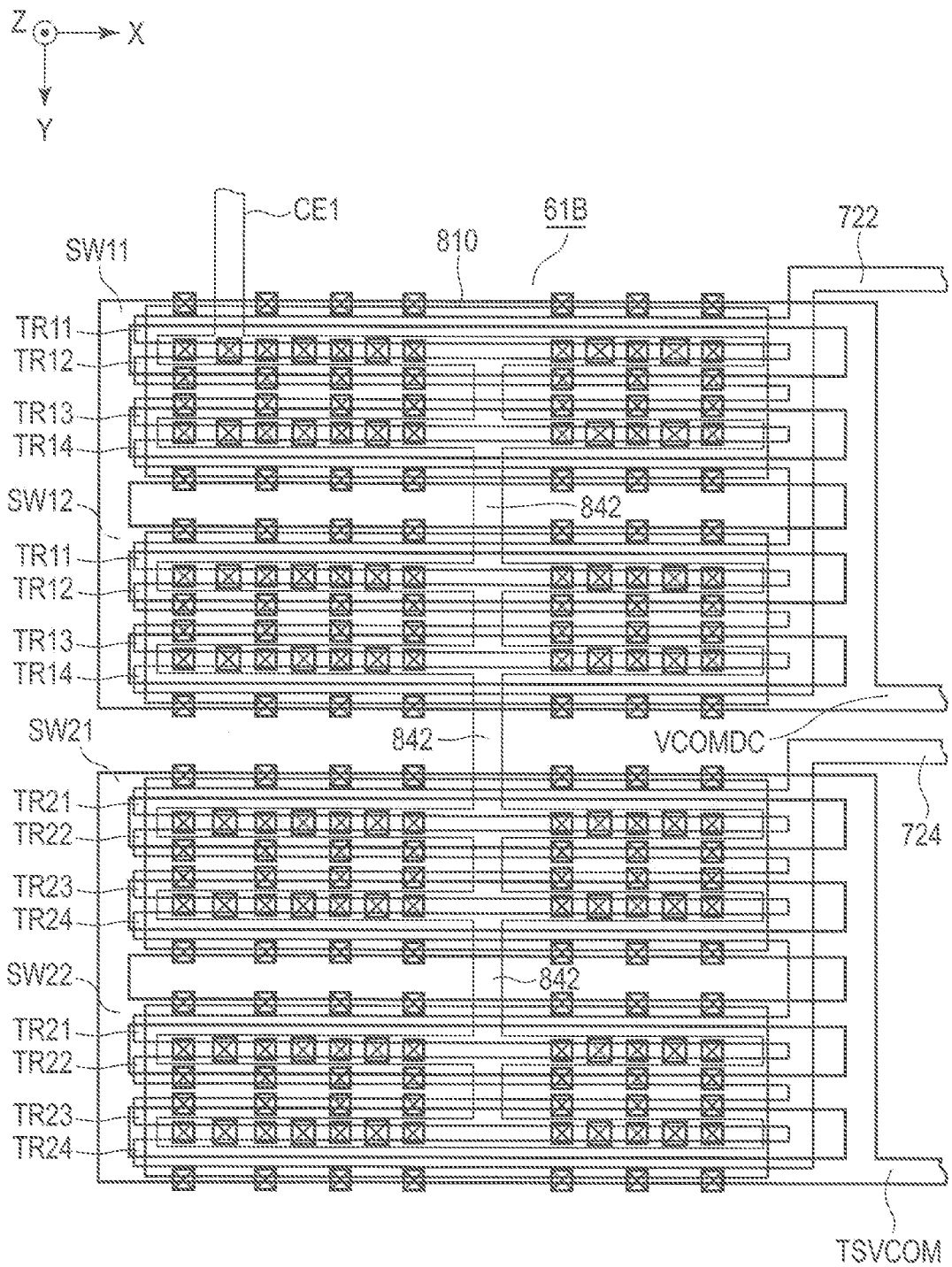
FIG. 17 is a diagram showing a schematic layout of the switch unit 61B shown in FIG. 15.
Figure 18:
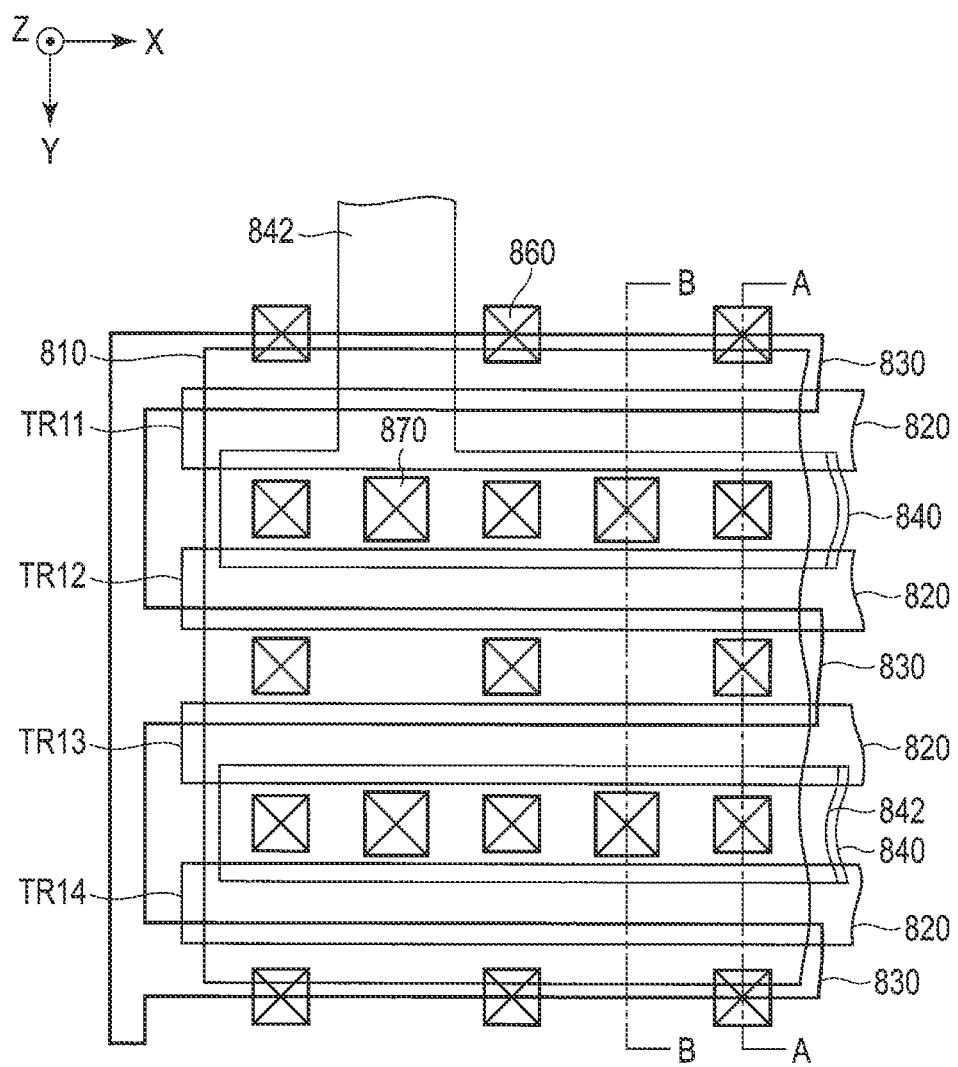
FIG. 18 is a partially enlarged view showing switch SW11 shown in FIG. 17.

Next, a schematic layout of the switch unit 61B will be explained with reference to FIG. 17 and FIG. 18. FIG. 18 is a partially enlarged view showing the switch SW11 shown in FIG. 17. In FIG. 17, the switch SW11, the switch SW12, the switch SW21, and the switch SW22 are arranged in the second direction Y, the first to fourth transistors TR11 to TR14 forming the switches SW11 and SW12 are arranged in the second direction Y, and the fifth to eighth transistors TR21 to TR24 forming the switches SW21 and SW22 are arranged in the second direction Y.

Each transistor is formed to extend in the first direction X, an approximately rectangular semiconductor layer 810 extending in the first direction X is formed commonly to the transistors, and the output signal line 842 connected commonly to the transistors is formed in close vicinity to centers of the transistors in the first direction X so as to extend in the second direction Y.

FIG. 18 is an enlarged view showing a part near an upper left part of switch SW11 shown in FIG. 17. FIG. 19 is a cross-sectional view seen along line A-A in FIG. 18. FIG. 20 is a cross-sectional view seen along line B-B in FIG. 18.

The switch SW11 includes the approximately rectangular semiconductor layer 810 commonly to the transistors TR11, TR12, TR13, and TR14, and longer sides of the semiconductor layer 810 extend in the first direction X. In addition, the semiconductor layer 810 is formed sequentially from the first transistor TR11 to the fourth transistor TR14 in the second direction Y. A drain electrode 830 of the first transistor TR11 is connected to the first drive signal line VCOMDC, and is electrically connected to a drain area 834 of the semiconductor layer 810 via contact holes 860. A gate electrode 820 is formed in parallel with the drain electrode 830 of the first transistor TR11, and the gate electrode 820 is connected to the first select signal line 722. A source electrode 840 is common to the transistors TR11, TR12, TR13, and TR14, and the source electrode 840 is electrically connected to a source area 844 of the semiconductor layer 810 through the contact holes 860 and is electrically connected to an output signal line 842 through contact holes 870. The output signal line 842 is connected to the common electrode CE1 as shown in FIG. 15.

The drain electrode 830 is common to the second transistor TR12 and the third transistor TR13 of the switch SW11, and the first drive signal line VCOMDC is connected to the drain electrode 830. The source electrode 840 of the first transistor TR11 and the second transistor TR12 is common, and is connected to the output signal line 842 through the contact holes 870. The source electrode 840 of the third transistor TR13 and the fourth transistor TR14 is common, and is connected to the output signal line 842 through the contact holes 870. The outer shape of the source electrode 840 overlaps the outer shape of the output signal line 842 and, in FIG. 17 and FIG. 18, the source electrode 740 and the output signal line 742 have the same outer shape to simplify the figure.

In the switch SW11, four transistors are arranged in the second direction Y, but the source electrodes 840 or the drain electrodes 830 of the adjacent transistors are commonly formed to attempt reduction in the formation area in the second direction Y.

The switch SW12 and the switch SW11 have the same configuration, and the switches SW21 and SW22 have the same configuration. The switch SW21 and the switch SW11 have the same configuration except the switch SW11 is connected to the second select signal line 724, and the second drive signal line TSVCOM.

As shown in the schematically cross-sectional views of FIG. 19 and FIG. 20, the transistors TR11 to TR12 forming the switch SW are formed on the first base 10. The configuration of the transistor formed from the first substrate 10 to the first insulating layer 11 in the cross-sectional view shown in FIG. 3 is illustrated in detail in FIG. 19 and FIG. 20.

A base layer 111 is formed on the first base 10 of a glass substrate or a resin substrate, and the semiconductor layer 810 is formed on a base layer 120. A channel area 814, a drain area 834, and a source area 844 are formed in the semiconductor layer 810. A gate insulating film 113 is formed on the semiconductor layer 810. A gate electrode 820 is formed on the gate insulating film 113. An insulating film 473 is formed on the gate insulating film 113 and the gate electrode 820. Contact holes 860 are formed in the insulating film 473. The drain electrode 830 and the drain area 834 are connected through a certain contact hole 860. In addition, the source electrode 840 and the source area 844 are connected through the other contact hole 860. An insulating film 475 is formed on the drain electrode 830 and the source electrode 840. A contact hole 870 is formed in the insulating film 475. The source electrode 840 and the output signal line 842 are connected through the contact hole 870.

The base layer 111 and the gate insulating film 113 are often formed of an inorganic insulating film such as silicon oxide or silicon nitride, but can also be formed of an organic insulating film. The insulating films 473 and 475 are often formed of an organic insulating film but can also be formed of an inorganic insulating film.

The output signal line 842 can be formed commonly to the transistors, by forming the output signal line 842 in a layer different from the layer of the drain electrodes 830 and the source electrodes 840 via the insulating film 475. In addition, reduction of the formation area in the second direction Y can be attempted by sharing the drain area 834 and the source area 844 by the adjacent transistors.

According to the embodiments, as described above, the display device capable of narrowing the frame can be provided.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention. In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a first base including a long side edge, a short side edge, and a corner edge between the long side edge and the short side edge; and
a plurality of common electrodes in a display area, wherein
the short side edge is parallel to a first direction,
the long side edge is parallel to a second direction intersecting the first direction,
the corner edge is formed in an arcuate shape,
the plurality of common electrodes includes a first common electrode and a second common electrode adjacent to the first common electrode in the first direction,
the first common electrode includes a first edge along the arcuate shape of the corner edge, and
in the first direction, a first width of the first common electrode is larger than a second width of the second common electrode.

2. The display device of claim 1, wherein
the first common electrode includes a second edge parallel to the long side edge and a third edge parallel to the second edge,
the first edge is connected to the second edge,
the first width is a width between the second edge and the third edge,
the second common electrode includes a fourth edge parallel to the third edge and a fifth edge parallel to the fourth edge,
the second width is a width between the fourth edge and the fifth edge, and
the third edge and the fourth edge face each other in the first direction with a gap.

3. The display device of claim 2, wherein the first edge is formed in a step shape along the corner edge.

4. The display device of claim 1, wherein
the first width of the first common electrode is a maximum width in the first direction,
the second width of the second common electrode is a maximum width in the first direction, and
the first common electrode and the second common electrode are separated from each other in the first direction.

5. The display device of claim 4, wherein the first edge is formed in a step shape along the corner edge.

6. The display device of claim 1, wherein
the first common electrode includes a second edge along the long side edge and a third edge along the second edge,
the first edge is connected to the second edge,
the first width is a width between the second edge and the third edge, the second common electrode includes a fourth edge along the third edge and a fifth edge along the fourth edge, the second width is a width between the fourth edge and the fifth edge, and the third edge and the fourth edge face each other in the first direction with a gap.

7. The display device of claim 6, wherein the first width of the first common electrode is a maximum width in the first direction, and the second width of the second common electrode is a maximum width in the first direction.

8. The display device of claim 7, wherein the first edge is formed in a step shape along the corner edge.

9. The display device of claim 7, wherein the first edge is located outside the display area.

10. The display device of claim 9, wherein the second edge is located outside the display area.

11. The display device of claim 7, wherein the first width is approximately double the second width.

\* \* \* \* \*